United States Patent
Lee et al.

(10) Patent No.: US 11,758,259 B2
(45) Date of Patent: Sep. 12, 2023

(54) ELECTRONIC APPARATUS AND CONTROLLING METHOD THEREOF

(71) Applicant: Samsung Electronics Co., Ltd., Suwon-si (KR)

(72) Inventors: Dongho Lee, Suwon-si (KR); Jongho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 200 days.

(21) Appl. No.: 17/196,170

(22) Filed: Mar. 9, 2021

(65) Prior Publication Data
US 2022/0070360 A1   Mar. 3, 2022

(30) Foreign Application Priority Data

Aug. 31, 2020   (KR) .................. 10-2020-0110616

(51) Int. Cl.
*H04N 23/61*   (2023.01)
*H04N 23/695*   (2023.01)
*H04N 23/951*   (2023.01)

(52) U.S. Cl.
CPC .......... *H04N 23/61* (2023.01); *H04N 23/695* (2023.01); *H04N 23/951* (2023.01)

(58) Field of Classification Search
CPC .......... H04N 5/23218; H04N 5/23219; H04N 5/23232; H04N 5/23296; H04N 5/23299
See application file for complete search history.

(56) References Cited

U.S. PATENT DOCUMENTS

| | | | |
|---|---|---|---|
| 9,781,350 B2 | 10/2017 | Gao et al. | |
| 10,187,579 B1 | 1/2019 | Wang et al. | |
| 10,313,417 B2 | 6/2019 | Chen et al. | |
| 10,574,899 B2 | 2/2020 | Wang et al. | |
| 2002/0136455 A1* | 9/2002 | Lin ...................... | G06F 3/0425 |
| | | | 382/218 |

(Continued)

FOREIGN PATENT DOCUMENTS

| | | |
|---|---|---|
| JP | 2011-59977 | 3/2011 |
| JP | 6200270 | 9/2017 |

(Continued)

OTHER PUBLICATIONS

International Search Report and Written Opinion dated Jun. 18, 2021 in corresponding International Application No. PCT/KR2021/002997.

*Primary Examiner* — Anner N Holder
(74) *Attorney, Agent, or Firm* — Nixon & Vanderhye P.C

(57) ABSTRACT

Disclosed is an electronic apparatus. The electronic apparatus includes: a camera and a processor configured to control the electronic apparatus to: track an object area including a user object from a captured image obtained through the camera and identify a display area from the captured image based on the tracked object area, and the processor may be further configured to: identify a display area of a first captured image based on the object area identified from the first captured image, identify the display area of a second captured image based on an object area identified from the second captured image, and identify a display area of a third captured image based on a display area of the first captured image and a display area of the second captured image.

20 Claims, 20 Drawing Sheets

(56) References Cited

U.S. PATENT DOCUMENTS

| | | | |
|---|---|---|---|
| 2005/0074185 A1* | 4/2005 | Jung | H04N 5/23296 |
| | | | 348/E5.042 |
| 2006/0267927 A1* | 11/2006 | Crenshaw | G06F 1/1626 |
| | | | 345/156 |
| 2010/0091110 A1 | 4/2010 | Hildreth | |
| 2010/0201837 A1 | 8/2010 | Won et al. | |
| 2015/0063661 A1* | 3/2015 | Lee | H04L 63/0861 |
| | | | 382/124 |
| 2015/0356743 A1 | 12/2015 | Kintou | |
| 2017/0302719 A1* | 10/2017 | Chen | H04N 19/33 |
| 2017/0358119 A1* | 12/2017 | Forutanpour | G06T 15/04 |
| 2017/0366738 A1 | 12/2017 | Iwamoto | |
| 2020/0197746 A1 | 6/2020 | Kang | |

FOREIGN PATENT DOCUMENTS

| | | |
|---|---|---|
| KR | 10-1414362 | 7/2014 |
| KR | 10-1687252 | 12/2016 |
| KR | 10-2033643 | 10/2019 |
| KR | 10-2099316 | 4/2020 |
| KR | 10-2112236 | 5/2020 |
| KR | 10-2266361 | 6/2021 |
| WO | 2015/020703 | 2/2015 |

\* cited by examiner

ELECTRONIC APPARATUS AND CONTROLLING METHOD THEREOF

CROSS-REFERENCE TO RELATED APPLICATION

This application is based on and claims priority under 35 U.S.C. § 119 to Korean Patent Application No. 10-2020-0110616, filed on Aug. 31, 2020, in the Korean Intellectual Property Office, the disclosure of which is incorporated by reference herein in its entirety.

BACKGROUND

1. Field

The disclosure relates to an electronic apparatus and a controlling method thereof. For example, the disclosure relates to an electronic apparatus for displaying an object included in a captured image and a controlling method thereof.

2. Description of Related Art

A user who mimics an exercise pose (e.g., yoga, stretching, etc.) by watching content provided by a television (TV) may not see their own pose. When the user captures the user using a camera and simultaneously displays the captured image with the content, the user may compare the correct pose in the content and the captured posture.

However, the content may be edited by an expert and a switching of a screen may be smooth, but editing may not be performed when the user is captured through the camera and thus, there may be a problem that the switching of the screen may not be smooth.

If an auto-zoom or auto-tracking is performed through the camera, a field of view of the camera may be fixed and thus, the user has to manually operate the camera, making the user feel inconvenient.

In an art of recognizing an object through a camera, a motion of the user may not be predicted in advance when tracking a simple motion of the user and thus, if the user abruptly changes a pose, there may be a problem in that some areas may not be displayed.

SUMMARY

Embodiments of the disclosure address at least the above-mentioned problems and/or disadvantages and provide at least the advantages described below.

Embodiments of the disclosure provide an electronic apparatus to identify a display area of an image based on display areas of each of a plurality of captured images and a controlling method thereof.

In accordance with an example aspect of the disclosure, the electronic apparatus includes: a camera and a processor configured to control the electronic apparatus to: track an object area including a user object from a captured image obtained through the camera and identify a display area from the captured image based on the tracked object area, and the processor is further configured to: identify a display area of a first captured image based on the object area identified from the first captured image, identify the display area of a second captured image based on an object area identified from the second captured image, and identify a display area of a third captured image based on a display area of the first captured image and a display area of the second captured image.

In accordance with an example aspect of the disclosure, a controlling method of an electronic apparatus includes: tracking an object area including a user object from a captured image and identifying a display area from the captured image based on the tracked object area, identifying a display area of a first captured image based on the object area identified from the first captured image, identifying the display area of a second captured image based on an object area identified from the second captured image; and identifying a display area of a third captured image based on a display area of the first captured image and a display area of the second captured image.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

The disclosure will be described in greater detail with reference to the attached drawings.

The terms used in the present disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be arbitrarily selected, in which case it will be described in detail in the description of the corresponding disclosure. Thus, the terms used in this disclosure should be defined based on the meaning of term, not a simple name of the term, and the contents throughout this disclosure.

Expressions such as "have," "may have," "include," "may include" or the like represent presence of corresponding numbers, functions, operations, or parts, and do not exclude the presence of additional features.

Expressions such as "at least one of A or B" and "at least one of A and B" should be understood to represent "A," "B" or "A and B."

As used herein, terms such as "first," and "second," may identify corresponding components, regardless of order and/or importance, and are used to distinguish a component from another without limiting the components.

In addition, a description that one element (e.g., a first element) is operatively or communicatively coupled with/to" or "connected to" another element (e.g., a second element) should be interpreted to include both the first element being directly coupled to the second element, and the first element being coupled to the second element through a third element.

A singular expression includes a plural expression, unless otherwise specified. It is to be understood that terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

A term such as "module," "unit," and "part," is used to refer to an element that performs at least one function or operation and that may be implemented as hardware or software, or a combination of hardware and software. Except when each of a plurality of "modules," "units," "parts," and the like must be realized in an individual hardware, the components may be integrated in at least one module or chip and be realized in at least one processor (not shown).

In the following description, a "user" may refer to a person using an electronic apparatus or an apparatus using an electronic apparatus (e.g., artificial intelligence electronic apparatus).

Various example embodiments will be described in greater detail below with reference to the accompanying drawings.

Figure 1:
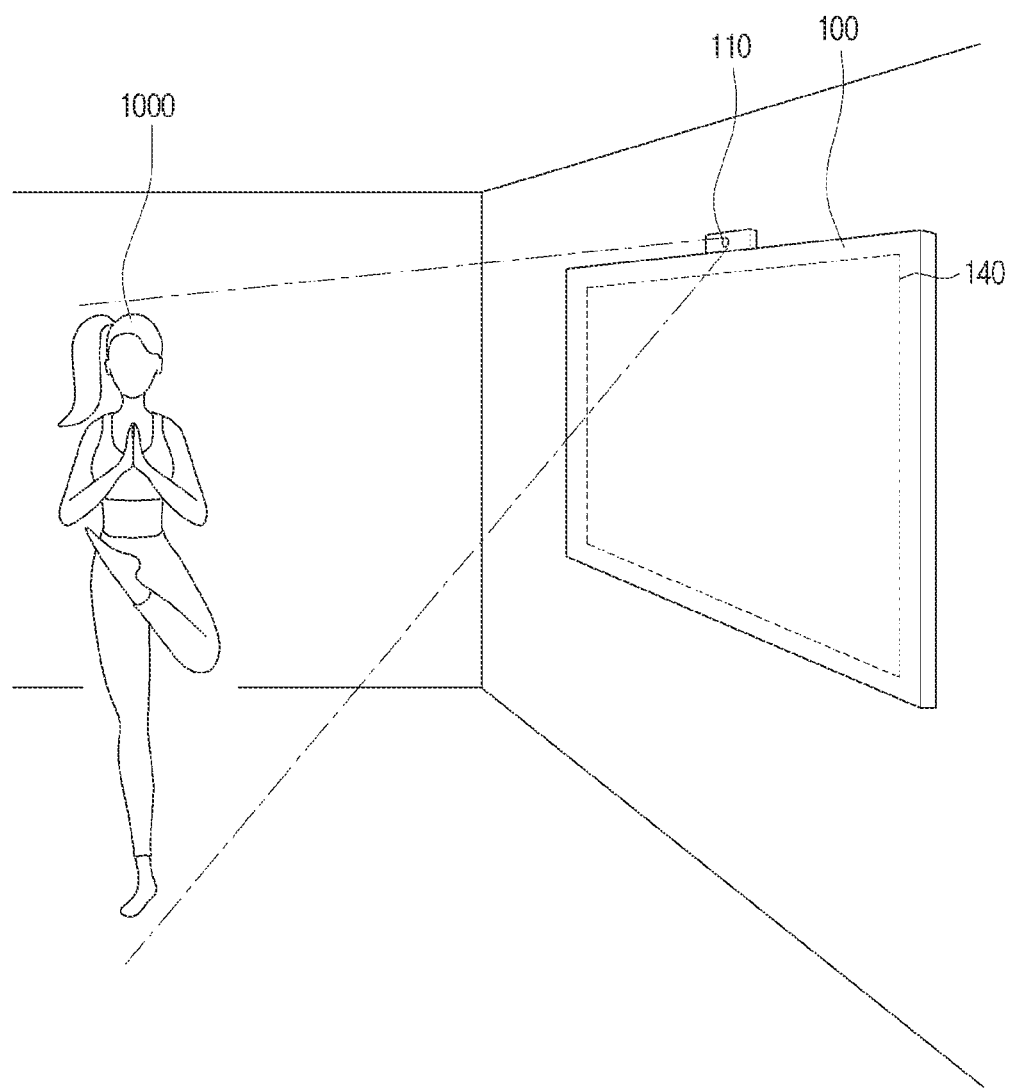
FIG. 1 is a diagram illustrating an example electronic apparatus capturing a user according to various embodiments.

FIG. 1 is a diagram illustrating an example electronic apparatus capturing a user according to various embodiments.

Referring to FIG. 1, an electronic apparatus 100 may include a camera 110. The electronic apparatus 100 may capture a user 1000 located in front of the electronic apparatus 100 through the camera 110. The electronic apparatus 100 may additionally include a display 140 and may display the captured image on the display 140. The captured image may include a user object (image type) corresponding to the user 1000.

The electronic apparatus 100 may not display all areas of the captured image on the display 140, since the resolution information of the camera 110 and the resolution information of the display 140 may be different. Therefore, the electronic apparatus 100 may crop a partial area of the captured image obtained. The electronic apparatus 100 may display only a cropped partial area of all areas of the captured image on the display 140. The cropped partial area may be a display area.

When the user 1000 changes a pose, a user object included in the captured image may also be changed. Accordingly, the electronic apparatus 100 may change a display area of the captured image displayed on the display 140 based on the size of the changed user object. However, it may be difficult to change the display area in real time with respect to the image captured in real time. Thus, in some situations, as illustrated by way of illustrative example in FIG. 6, there may be a problem in that some areas of the user object may not be displayed on the display 140.

Figure 2:
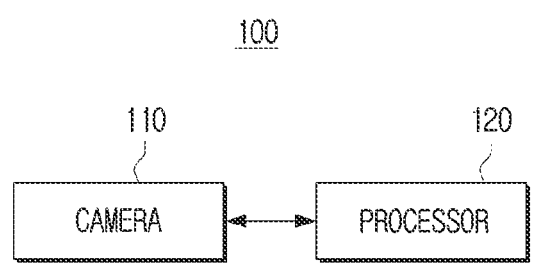
FIG. 2 is a block diagram illustrating an example electronic apparatus according to various embodiments.

FIG. 2 is a block diagram illustrating an example electronic apparatus according to various embodiments.

Referring to FIG. 2, the electronic apparatus 100 may include a camera 110 and a processor (e.g., including processing circuitry) 120.

The electronic apparatus 100 according to various embodiments may include at least one of, for example, and without limitation, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a medical device, a camera, a wearable device, or the like. A wearable device may include at least one of an accessory type (e.g., a watch, a ring, a bracelet, an ankle bracelet, a necklace, a pair of glasses, a contact lens or a head-mounted-device (HMD)); a fabric or a garment-embedded type (e.g.: electronic cloth); skin-attached type (e.g., a skin pad or a tattoo); a bio-implantable circuit, or the like. In some embodiments, the electronic apparatus 100 may include at least one of, for example, and without limitation, a television, a digital video disk (DVD) player, an audio system, a refrigerator, air-conditioner, a cleaner, an oven, a microwave, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAYSTATION™), an electronic dictionary, an electronic key, a camcorder, an electronic frame, or the like.

If the electronic apparatus 100 corresponds to a display device, the electronic apparatus 100 may include various devices including a display. The electronic apparatus 100 may include, for example, and without limitation, an electronic board, TV, desktop PC, notebook PC, smartphone, tablet PC, server, or the like. The above example is merely an example to describe an electronic apparatus and the various embodiments are not necessarily limited thereto.

The camera 110 is configured to generate a captured image by capturing a subject. The captured image may include both a moving image and a still image. The camera 110 may obtain an image of at least one external device and may be implemented as a camera, a lens, an infrared sensor, or the like.

The camera 110 may include a lens and an image sensor. The type of lens may be a general purpose lens, a wide angle lens, a zoom lens, or the like, and may be determined according to the type, characteristics, usage environment, or the like, of the electronic apparatus 100. A complementary metal oxide semiconductor (CMOS) and a charge coupled device (CCD), or the like, may be used as the image sensor.

The camera 110 may output the incident light as an image signal. For example, the camera 110 may include a lens, a pixel, and an analog-to-digital (AD) converter. The lens may collect the light of the subject to form an optical image in a captured area, and the pixel may output the light input through the lens as an analog image signal. The AD converter may convert an analog image signal into a digital image signal and output the converted signal. The camera 110 may be arranged to capture a front direction of the electronic apparatus 100, and may capture a user present on the front of the electronic apparatus 100 to generate a captured image.

In describing the electronic apparatus 100 according to an embodiment, there is one camera 110, but a plurality of cameras may be arranged in an actual implementation. The electronic apparatus 100 may include a plurality of cameras, and may combine images received through the plurality of cameras to identify a user's head posture. Using a plurality of cameras rather than using one camera, three-dimensional movement may be more precisely analyzed, so that it would be effective to identify the user's head posture.

The processor 120 may include various processing circuitry and control the overall operation of the electronic apparatus 100. The processor 120 may function to control overall operations of the electronic apparatus. Hereinafter, when it is described that the processor performs a given function, it will be understood that this may also refer to the processor controlling the electronic apparatus 100 to perform the described function.

The processor 120 may be implemented with, for example, and without limitation, a digital signal processor (DSP) for processing of a digital signal, a microprocessor, a time controller (TCON), or the like. The processor 120 may include, for example, and without limitation, one or more among a central processor (CPU), a micro controller unit (MCU), a microprocessor (MPU), a controller, an application processor (AP), a communication processor (CP), an advanced reduced instruction set computing (RISC) machine (ARM) processor, a dedicated processor, or may be defined as a corresponding term. The processor 120 may be implemented in a system on chip (SoC) type or a large scale integration (LSI) type which a processing algorithm is built therein, application specific integrated circuit (ASIC), or in a field programmable gate array (FPGA) type. The processor 120 may perform various functions by executing computer executable instructions stored in the memory.

The processor 120 may control the electronic apparatus 100 to track the object area including the user object in the captured image obtained through the camera 110 and identify the display area in the captured image based on the tracked object area, and the processor 120 may identify the display area of the first captured image based on the object area identified in the first captured image, identify the display area of the second captured image in the object area identified in the second captured image, and identify the display area of the third captured image based on the display area of the first captured image and the display area of the second captured image.

The processor 120 may receive a captured image capturing the front of the electronic apparatus 100 through the camera 110. The processor 120 may identify whether a user object corresponding to the user 1000 is included in the captured image received. If a user object is included in the captured image received, the processor 120 may identify an object area that includes a user object in the captured image received. The object area may refer to an area in which a user object is displayed among all areas of the captured image. The processor 120 may identify the object area based on the location information of the user object in the captured image, and may track the changed object area in real time. If the user 1000 changes or moves the pose, the object area may also be changed. The processor 120 may track the changed object area in real time.

The processor 120 may identify the display area based on the identified object area. The display area may refer to an area to be displayed on a display among the entire area of the captured image. The display may be a display 140 of the electronic apparatus 100 and may be a display of an external device according to an implementation example.

As illustrated in FIG. 1, since the resolution of the camera 110 and the resolution of the display 140 may be different, the processor 120 may obtain an image to be displayed by changing or cropping the size of the captured image. An image obtaining operation according to an embodiment will be described based on an image obtained through a cropping operation. The processor 120 may remove some areas of the captured image to display the remaining areas or specify a partial area of the captured image to display only some areas.

The processor 120 may identify the user object in the first captured image and identify the object area based on the identified user object. The processor 120 may identify a display area corresponding to the first captured image based on the identified object area.

The processor 120 may also identify the user object in the second captured image and identify the object area based on the identified user object. The processor 120 may identify a display area corresponding to the second captured image based on the identified object area.

The first and second captured images may include images received in successive frames. The second captured image may be received successively after the first captured image is received. For convenience, the first captured image may refer to an image capturing the user 1000 taking a first pose, and the second captured image may refer to an image capturing the user 1000 taking a second pose after taking the first pose.

In order to distinguish an object area and a display area of the first and second captured images, an object area of the first captured image may be described as a first object area, and an object area of the second captured image may be described as a second object area. The display area of the first captured image may be described as a first display area, and a display area of the second captured image may be described as a second display area.

The operation of distinguishing the object area and the display area corresponding to the first captured image and the second captured image will be described in greater detail below with reference to FIGS. 4, 5 and 6.

The processor 120 may identify the display area of the third captured image based on the display area of the first captured image (the first display area) and the display area (second display area) of the second captured image. The third captured image may refer to an image received after the first captured image and the second captured image are received.

If the size of the first display area and the size of the second display area are different, the processor 120 may determine whether to set a display area of the third captured image based on the size of which display area.

The processor 120 may also identify the display area of the third captured image itself. The display area of the third captured image may be preset based on the display area obtained from the first and second captured images. When the display area is changed in real time, the screen switching may not be smooth, so that the user may feel inconvenient. The processor 120 may determine the display area of the current captured image based on the display area of the past captured image. It is not that the display area for the current captured image may not be newly identified, and the processor 120 may set the display area determined based on the past captured image to display the image, and then may newly identify the display area of the captured image received.

To clearly distinguish this, the display area may be divided into an expected display area and a set display area. The expected display area may refer to a display area identified based on a user object included in the captured image received. The set display area may refer to an area to be displayed on the display 140. Therefore, the expected display area and the set display area may be different even in the image of the same point in time (or same time or same time point).

Figure 5:
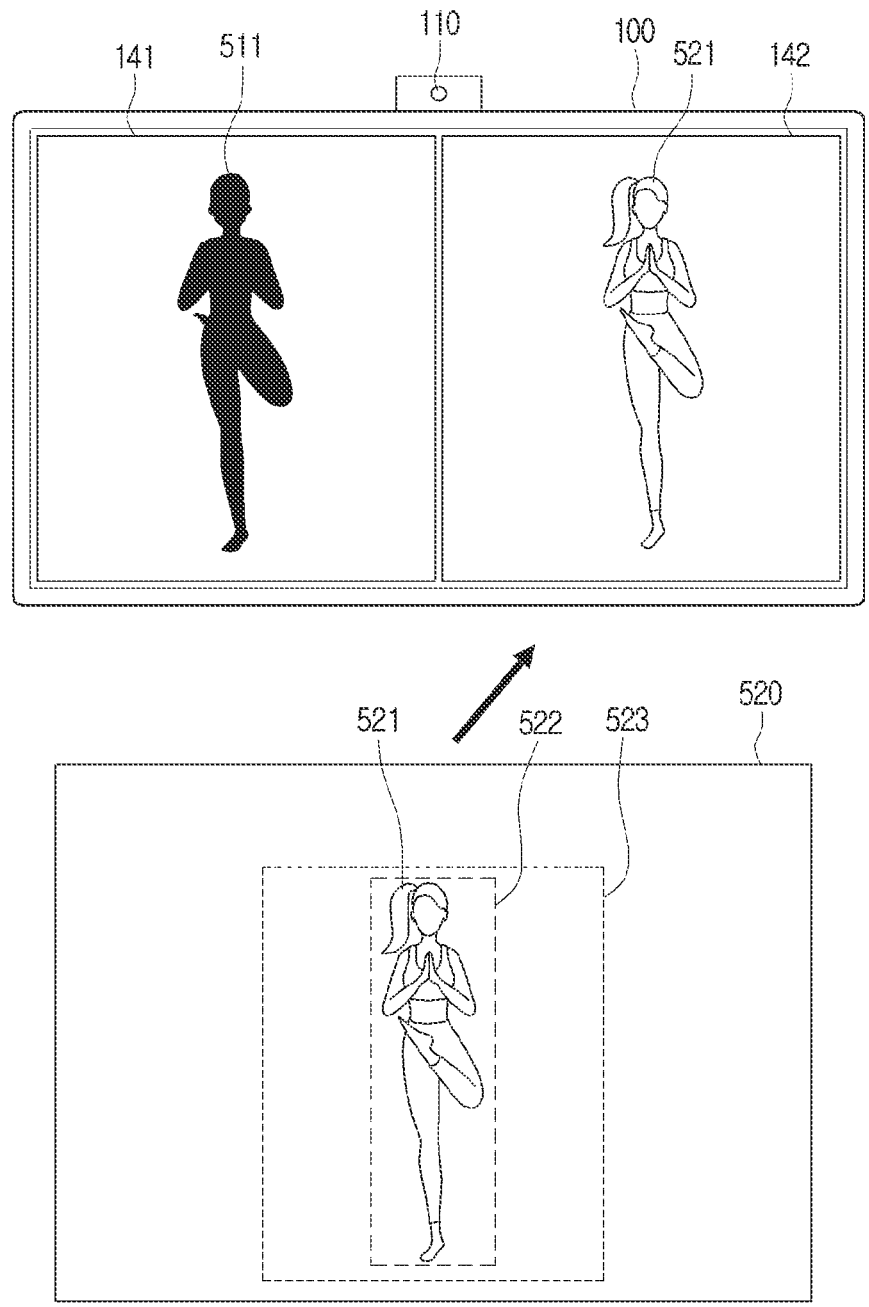
FIG. 5 is a diagram illustrating an example operation of displaying an image capturing a user taking a first pose according to various embodiments.

For example, in the embodiment illustrated in FIG. 5, the expected display area and the set display area may be the same. In this example, the image displayed on the display 140 may include all of the user objects. It is assumed that in the first captured image, the expected display area is a set display area.

Figure 6:
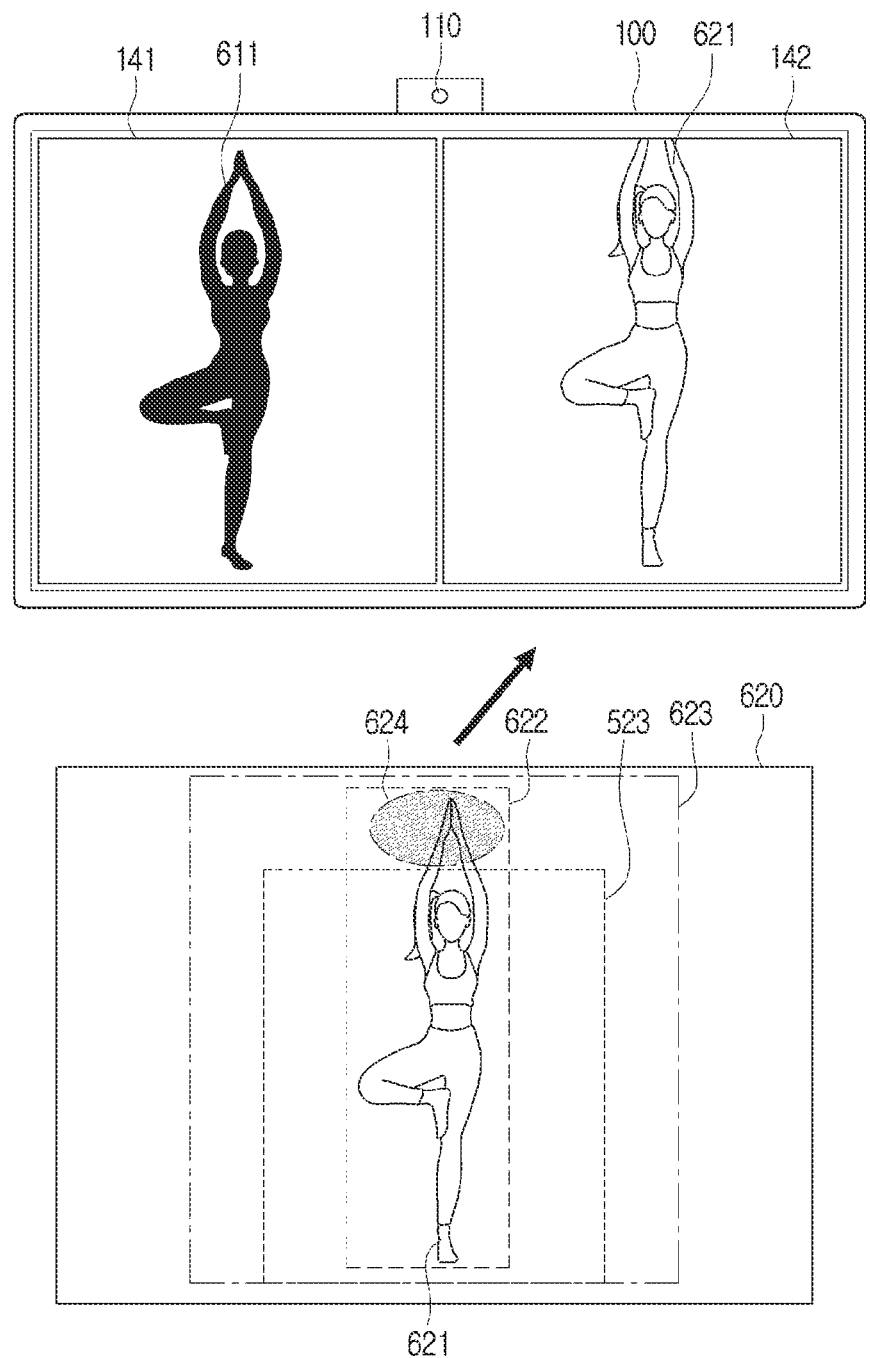
FIG. 6 is a diagram illustrating an example operation of displaying an image capturing a user taking a second pose according to various embodiments.

In the embodiment illustrated in FIG. 6, an expected display area 623 and a set display area 523 may be different. The expected display area 623 may be determined based on the current object area 622, but the set display area 523 may be obtained based on a captured image 520 received in the past.

The may be different as described above because there may be a need to maintain the existing display area in order to smooth the screen switching. In addition, it may be necessary to address a problem when the display area is changed in real time, and the processing speed may take time, thereby causing a delay in a screen.

The processor 120 may identify the setting display area of the third captured image based on the expected display area of the first captured image and the expected display area of the second captured image.

In order to change the set display area, an expected display area having a size larger than the size of the preset display area needs to be identified. As will be described in greater detail below with reference to FIG. 7, since the processor 120 identifies a set display area based on a larger size of the expected display area, the set display area will always be increased without decrease, when the plurality of captured images are continuously received.

In order to prevent and/or reduce a consistent operation, the processor 120 may change to the expected display area (the expected display area identified in the currently received captured image) rather than the set display area after a threshold time has elapsed. For example, referring to FIG. 12, even though the expected display area is smaller in the captured image obtained at 11 seconds, the set display area may be displayed to be smaller.

The display area may be divided into the expected display area and the set display area, but may be described as the display area for convenience.

When the size of the (expected) display area of the second captured image is greater than the size of the (expected) display area of the first captured image, the processor 120 may identify a (set) display area of the third captured image based on the (expected) display area of the second captured image.

The electronic apparatus 100 addresses a problem that a portion of the body of the user 1000 is not displayed on the display 140, when the user 1000 abruptly changes the pose. If the display area of the second captured image is smaller than the size of the display area of the first captured image, the processor 120 may not need to change the currently set display area. If the display area is maintained in a large state, the screen may not be cut in a point of view of the user and all the portions of the body of the user 1000 may also be displayed. Accordingly, the processor 120 may change the existing set display area, in a case where the size of the (expected) display area of the second captured image is greater than the size of the (expected) display area of the first captured image. The detailed description related thereto will be described later with reference to FIGS. 7 to 10.

The processor 120 may identify the object area based on the height of the user object in the captured image and may identify the (expected) display area based on the identified height of the object area.

The object area may have the horizontal information and the vertical information. An element which is most important to identify the display area may be vertical information. The vertical information may be height information. The processor 120 may determine the height of the object area based on the height of the user object and determine the height of the display area based on the determined height of the object area.

The processor 120 may determine the width of the display area based on the horizontal information. It may be assumed that the user takes a pose of moving left and right rapidly. The processor 120 may identify a range of left and right movement of the user, and may identify a display area based on the identified range.

If the (expected) display area of which size is greater than the (expected) display area of the first captured image is identified in the plurality of second captured images of a threshold number or more that are captured after the first captured image, the processor 120 may identify the (set) display area of the third captured image, and the third captured image may be an image captured after the plurality of second captured images.

The plurality of second captured images of the threshold number or more may include a consecutive case and also a non-consecutive case.

The second captured image may include a plurality of images. The processor 120 may compare the (expected) display area of the first captured image with the (expected)

display area of the plurality of second captured images to identify the (set) display area of the third captured image. The processor 120 may take into account the plurality of second captured images to identify whether a predetermined event has occurred for greater than or equal to the threshold number. If the display area is identified based on all operations of the user 1000, the amount of data throughput may increase and screen switching may slow to generate a delay. Accordingly, when a preset event occurs, the processor 120 may change the (set) display area.

According to an embodiment, the predetermined event may refer, for example, to the size of the (expected) display area of the second captured image being larger than the size of the (expected) display area of the first captured image. A more detailed description related thereto will be described in greater detail below with reference to FIGS. 7, 8, 9 and 10.

According to an embodiment, the preset event may refer that the size of the (expected) display area of the second captured image is greater than the size of the (expected) display area of the first captured image and may be continuously obtained for greater than or equal to a threshold time. The processor 120 may identify the display area of the third captured image when the (expected) display area larger than the size of the (expected) display area of the first captured image is identified in the second captured image, which is captured continuously and of which number is greater than or equal to a threshold number. The detailed description related thereto will be described later with reference to FIGS. 11 to 12.

According to an embodiment, the preset event may refer, for example, to the size of the (expected) display area of the second captured image being greater than the size of the (expected) display area of the first captured image and is identified by greater than or equal to a threshold number. The operation of identifying above the threshold number need not be continuous. A detailed description will be described in greater detail below with reference to FIGS. 13 and 14.

The electronic apparatus 100 may further include the display 140, and the processor 120 may control the display 140 to display a screen in which the content image received from an external server is included in a first area and the identified (set) display area is included in a second area.

The content may be implemented in a form of being received in real time or being stored in the memory 150 of the electronic apparatus 100 in advance. An operation of displaying content additionally will be described in greater detail below with reference to FIGS. 5, 6, and 10.

The processor 120 may track a guide area including a guide object in a content image, and may identify the size information of the tracked guide area and the size information of the object area of the first captured image, and the (set) display area of the third captured image based on the size information of the object of the second captured image. The guide object may refer to an object taking a specific pose in the content so that the user 1000 may mimic. The guide object may be an object which captures an actual person, and may be a virtual three-dimensional (3D) character, or the like. The guide area may refer to an area where a guide object is located in the entire area of the content image. The guide area may be a guide area 512 and a guide area 612 of FIG. 17.

The processor 120 may obtain the first ratio information based on the size of the guide area identified in the first content image and the size of the guide area identified in the second content image, obtain second ratio information based on the size of the object area of the first captured image and the size of the object area of the second captured image, and identify the display area of the third captured image based on the first ratio information and the second ratio information.

The processor 120 may identify the display area of the third captured image based on the ratio information which is relatively larger between the first ratio information and the second ratio information.

A detailed description related to the operation of obtaining ratio information based on the object area will be described in greater detail below with reference to FIGS. 16, 17, 18 and 19. According to an embodiment, the ratio information may be obtained based on the display area, and a detailed description thereof will be described in greater detail below with reference to FIG. 15.

The display 120 may identify the (set) display area to be displayed through the display 140 in the captured image based on the resolution information and the tracked object area of the display 140.

The resolution of the display 140 and the resolution of the captured image may be different. Accordingly, the processor 120 may not display the captured image as it is on the display 140. The processor 120 may crop the captured image according to the resolution information of the display 140. The processor 120 may identify the (set) display area to be displayed on the display 140 based on the resolution information of the display 140 and the size information of the object area, and may control the display 140 to display image information corresponding to the identified (set) display area.

When the (set) display area corresponding to the third captured image is identified, the processor 120 may control the camera 110 based on the identified (set) display area. If the entire appearance of the user object is included in the captured image obtained by the camera 110, the processor 120 may determine whether to zoom-in or zoom-out based on the identified (set) display area. The zoom-in or zoom-out operation may be determined based on the ratio information.

Figure 19:
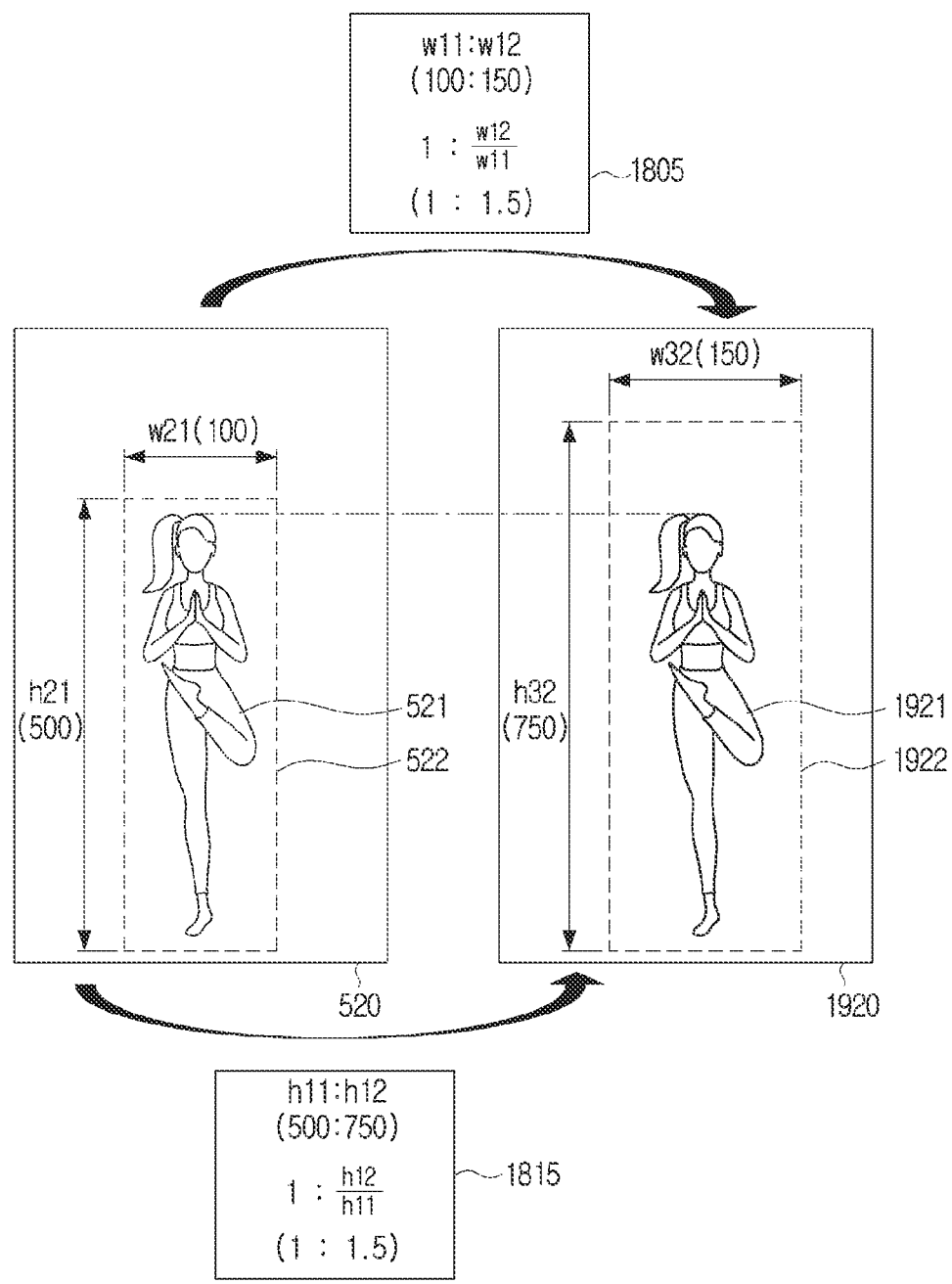
FIG. 19 is a diagram illustrating an example operation of displaying an image by applying ratio information according to various embodiments.

For example, if a changed object area 1922 as illustrated in FIG. 19 corresponds to a small size by a predetermined level in a received captured image 1920, the processor 120 may control the camera 110 to zoom in.

For example, if all the changed object area 1922 illustrated in FIG. 19 is not included in the received captured image 1920, the processor 120 may control the camera 110 to zoom out.

A zooming operation of zoom-in and zoom-out is described, but panning or tilting may be applied in the same manner.

The electronic apparatus 100 may divide the object area and the display area based on the user object and analyze the past (expected) display area to determine a future (set) display area. Thus, since the electronic apparatus 100 does not need to process the (set) display area in real time, it is possible to provide a smooth screen switching service to the user, and a problem that a part of the body of the user is not displayed on the screen may be addressed.

The electronic apparatus 100 may automatically control the camera 110 based on the changed (set) display area, the user does not need to adjust an angle and magnification of a camera manually.

Although a simple configuration of the electronic apparatus 100 is described above, various configurations may be additionally provided at implementation. An example will be described in greater detail below with reference to FIG. 3.

Figure 3:
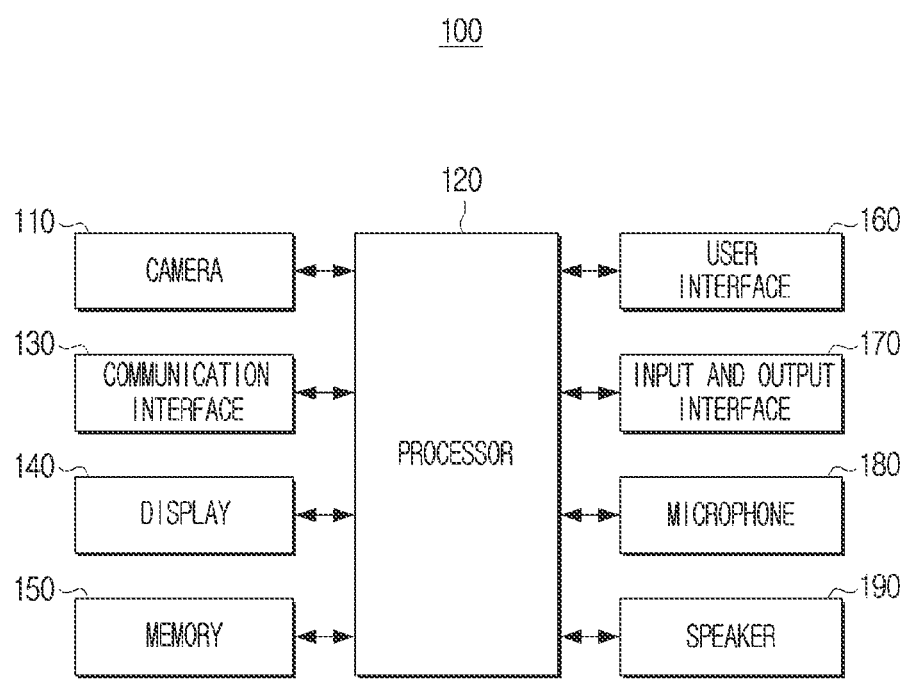
FIG. 3 is a block diagram illustrating a example configuration of the electronic apparatus of FIG. 2 according to various embodiments.

FIG. 3 is a block diagram illustrating an example configuration of the electronic apparatus 100 of FIG. 2 according to various embodiments.

Referring to FIG. 3, the electronic apparatus 100 may include the camera 110, the processor (e.g., including processing circuitry) 120, a communication interface (e.g., including communication circuitry) 130, a display 140, a memory 150, a user interface (e.g., including interface circuitry) 160, an input and output interface (e.g., including input/output circuitry) 170, a microphone 180, and a speaker 190.

The operations of the camera 110 and the processor 120 which are redundant with the above descriptions may not be repeated here.

The communication interface 130 may include various communication circuitry and communicate with other external devices using various types of communication methods. The communication interface 130 may include, for example, and without limitation, a Wi-Fi module, a Bluetooth module, an infrared communication module, a wireless communication module, or the like. Each communication module may be implemented as at least one hardware chip.

The Wi-Fi module and the Bluetooth module perform communication using a Wi-Fi method and a Bluetooth method, respectively. When using the Wi-Fi module or the Bluetooth module, various connection information such as a service set identifier (SSID) and a session key may be transmitted and received first, and communication information may be transmitted after communication connection.

The infrared ray communication module may perform communication according to infrared data association (IrDA) technology that transmits data wireless to a local area using infrared ray between visible rays and millimeter waves.

The wireless communication module may include at least one communication chip performing communication according to various communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, in addition to the communication methods as described above.

The communication interface 130 may include at least one of a local area network (LAN) module, Ethernet module, or wired communication module performing communication using a pair cable, a coaxial cable, an optical cable, an ultra-wide band (UWB) module, or the like.

According to an embodiment, the communication interface 130 may use the same communication module (for example, Wi-Fi module) for communicating with an external device such as a remote controller and an external server.

According to another example, the communication interface 130 may use a different communication module (for example, a Wi-Fi module) to communicate with an external server and an external device such as a remote controller. For example, the communication interface 130 may use at least one of an Ethernet module or a Wi-Fi module to communicate with the external server, and may use a Bluetooth (BT) module to communicate with an external device such as a remote controller. However, this is only an example and the communication interface 130 may use at least one communication module among various communication modules when communicating with a plurality of external devices or external server in other implementations.

The display 140 includes a display panel to output an image. The display 140 may be implemented as various types of panels such as, for example, and without limitation, a liquid crystal display (LCD) panel, organic light emitting diodes (OLED) display panel, a plasma display panel (PDP), and the like. In the display 140, a driving circuit which may be implemented in a type of an a-Si thin film transistor (TFT), a low temperature poly silicon (LTPS) TFT, an organic TFT (OTFT), and a backlight may be included. Further, the display 140 may be implemented as at least one of a touch screen coupled with a touch sensor, a flexible display, a three-dimensional (3D) display, or the like.

According to an embodiment, the display 140 may include not only a display panel to output an image but also a bezel that houses a display panel. In particular, the bezel according to an embodiment may include a touch sensor (not illustrated) for sensing a user interaction.

The memory 150 may be implemented as an internal memory such as, for example, and without limitation, a read-only memory (ROM) (for example, electrically erasable programmable read-only memory (EEPROM)), a random-access memory (RAM) or a memory separate from the processor 120. In this case, the memory 150 may be implemented as at least one of a memory embedded within the electronic apparatus 100 or a memory detachable from the electronic apparatus 100 according to the usage of data storage. For example, the data for driving the electronic apparatus 100 may be stored in the memory embedded within the electronic apparatus 100, and the data for upscaling of the electronic apparatus 100 may be stored in the memory detachable from the electronic apparatus 100.

A memory embedded in the electronic apparatus 100 may be implemented as at least one of a volatile memory such as a dynamic random access memory (DRAM), a static random access memory (SRAM), a synchronous dynamic random access memory (SDRAM), or a non-volatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive (HDD) or a solid state drive (SSD). In the case of a memory detachably mounted to the electronic apparatus 100, the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a universal serial bus (USB) memory) connectable to the USB port, or the like.

The user interface 160 may include various interface circuitry and be implemented with a device such as, for example, and without limitation, at least one of a button, a touch pad, a mouse, a keyboard, or a touch screen capable of performing the above-described display function and operation input function. The button may be various types of buttons such as at least one of a mechanical button, a touch pad, a wheel, or the like, formed in an arbitrary area such as at least one of a front portion, a side portion, a back portion, or the like, of the outer surface of the main body of the electronic apparatus 100.

The input and output interface 170 may include various input/output circuitry, such as, for example, and without limitation, at least one of a high-definition multimedia interface (HDMI), mobile high-definition link (MHL), universal serial bus (USB), display port (DP), Thunderbolt, video graphics array (VGA) port, RGB port, d-subminiature (D-SUB), digital visual interface (DVI), and the like.

The input and output interface 170 may input or output at least one of an audio signal and a video signal.

In various embodiments, the input and output interface 170 may include a port for inputting or outputting an audio signal or a video signal separately, or may be implemented as one port that inputs or outputs all the audio signals or video signals.

The electronic apparatus 100 may further include a microphone 180. The microphone 180 may include an element to receive a user voice or other sound and convert to audio data.

The microphone 180 may receive the user voice in an active state. For example, the microphone 180 may be integrally formed as an integral unit on at least one of an upper side, a front side direction, a side direction, or the like of the electronic apparatus 100. The microphone 180 may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or the like.

The electronic apparatus 100 may include the speaker 190. The speaker 190 may include an element to output various audio data, various alarm sounds, a voice message, or the like, which are processed by the input and output interface 170.

Figure 4:
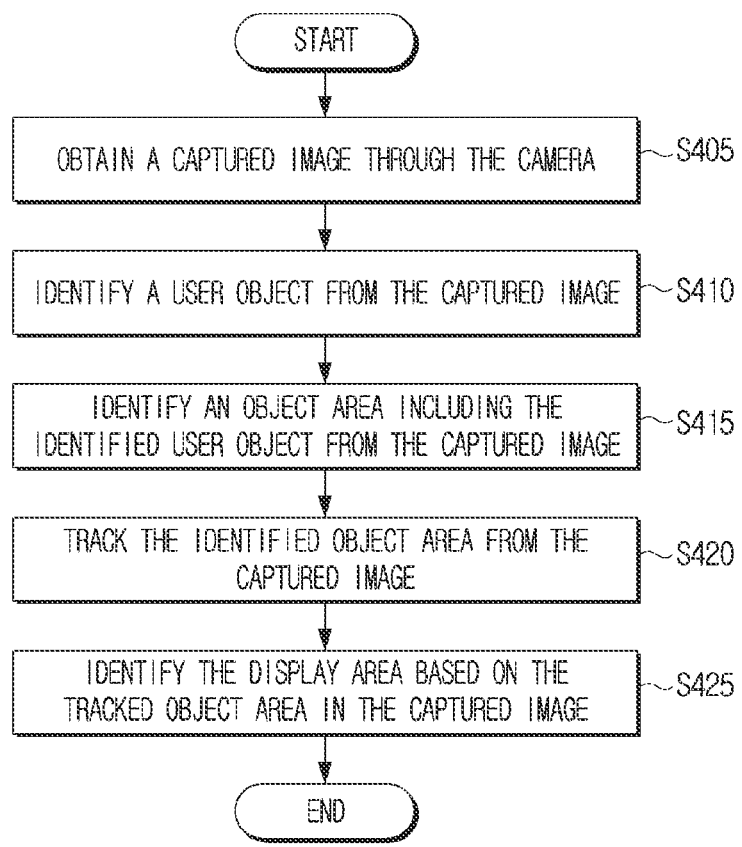
FIG. 4 is a flowchart illustrating an example operation of tracking a user in a captured image capturing a user according to various embodiments.

FIG. 4 is a flowchart illustrating an example operation of tracking a user in a captured image capturing a user according to various embodiments.

Referring to FIG. 4, the electronic apparatus 100 may obtain a captured image through the camera 110 in operation S405. The captured image may be an image capturing the front of the electronic apparatus 100. In general, the user 1000 may be located in the front of the electronic apparatus 100 as illustrated in FIG. 1, the captured image may be an image to capture the user.

The electronic apparatus 100 may identify a user object from the captured image obtained in operation S410. The user object may refer, for example, to a human object and the electronic apparatus 100 may identify whether the user object is included in the captured image.

If the electronic apparatus 100 identifies a user object from the captured image, the electronic apparatus 100 may identify the object area including the identified user object in operation S415.

The electronic apparatus 100 may track the identified object area in operation S420. The tracking may refer, for example, to tracking an object area to identify a change in the object area.

The electronic apparatus 100 may identify the display area based on the tracked object area in the captured image in operation S425. The display area may refer to an area displayed on the display 140 of the electronic apparatus 100. The entire captured image may not be displayed on the display 140 of the electronic apparatus 100, and a portion corresponding to the display area of the entire area of the captured image may be displayed on the display 140.

FIG. 5 is a diagram illustrating an example operation of displaying an image capturing a user taking a first pose according to various embodiments.

Referring to FIG. 5, the electronic apparatus 100 may capture the user 1000 through the camera 110 and may obtain a captured image 520 taking the first pose. The electronic apparatus 100 may identify the user object 521 from the captured image 520. The electronic apparatus 100 may identify the object area 522 based on the identified user object 521. The electronic apparatus 100 may identify the display area 523 based on the identified object area 522.

The electronic apparatus 100 may display the identified display area 523 on the display 140 of the electronic apparatus 100. The electronic apparatus 100 may divide the area into the first area 141 and the second area 142.

The electronic apparatus 100 may display the content received from the external server on a first area 141. The content may include the guide object 511. The electronic apparatus 100 may display the identified display area 523 of the captured image 520 in the second area 142. The image displayed in the second area 142 may include the user object 521.

The electronic apparatus 100 may display the user object 521 on the second area 142 at the same time with displaying the guide object 511 on the first area 141 and thus, the user 1000 may easily mimic the pose of the guide object 511 while directly watching the display 140.

FIG. 6 is a diagram illustrating an example operation of displaying an image capturing a user taking a second pose according to various embodiments.

Referring to FIG. 6, the electronic apparatus 100 may capture the user 1000 through the camera 110, and may obtain the captured image 620 taking the second pose. It is assumed a situation where the user takes the second pose after taking the first pose.

The electronic apparatus 100 may identify the user object 621 from the captured image 620. The electronic apparatus 100 may identify an object area 622 based on the identified user object 621.

The display area 523 may correspond to the display area of FIG. 5. If the user 1000 suddenly changes from the first pose to the second pose, the display area 523 may be maintained without being changed in that the processing for identifying the display area 523 may take time. It is assumed that the user taking the second pose than the first pose is captured in more areas. An object area 622 corresponding to the second pose may be larger than the display area 523. A part of an area 624 may be out of the display area 523. The portion of the area 624 out of the display area 523 may not be displayed on the display 140 of the electronic apparatus 100.

The electronic apparatus 100 may display the identified display area 523 on the display 140 of the electronic apparatus 100. The content may include a guide object 611. The electronic apparatus 100 may display the identified display area 523 of the captured image 620 in the second area 142. The image displayed on the second area 142 may include the user object 621. However, the image displayed on the second area 142 may not include a part of the captured images 620.

If time has elapsed, the electronic apparatus 100 may identify the display area 623 of the captured image 620 based on the identified object area 622 from the captured image 620.

Figure 7:
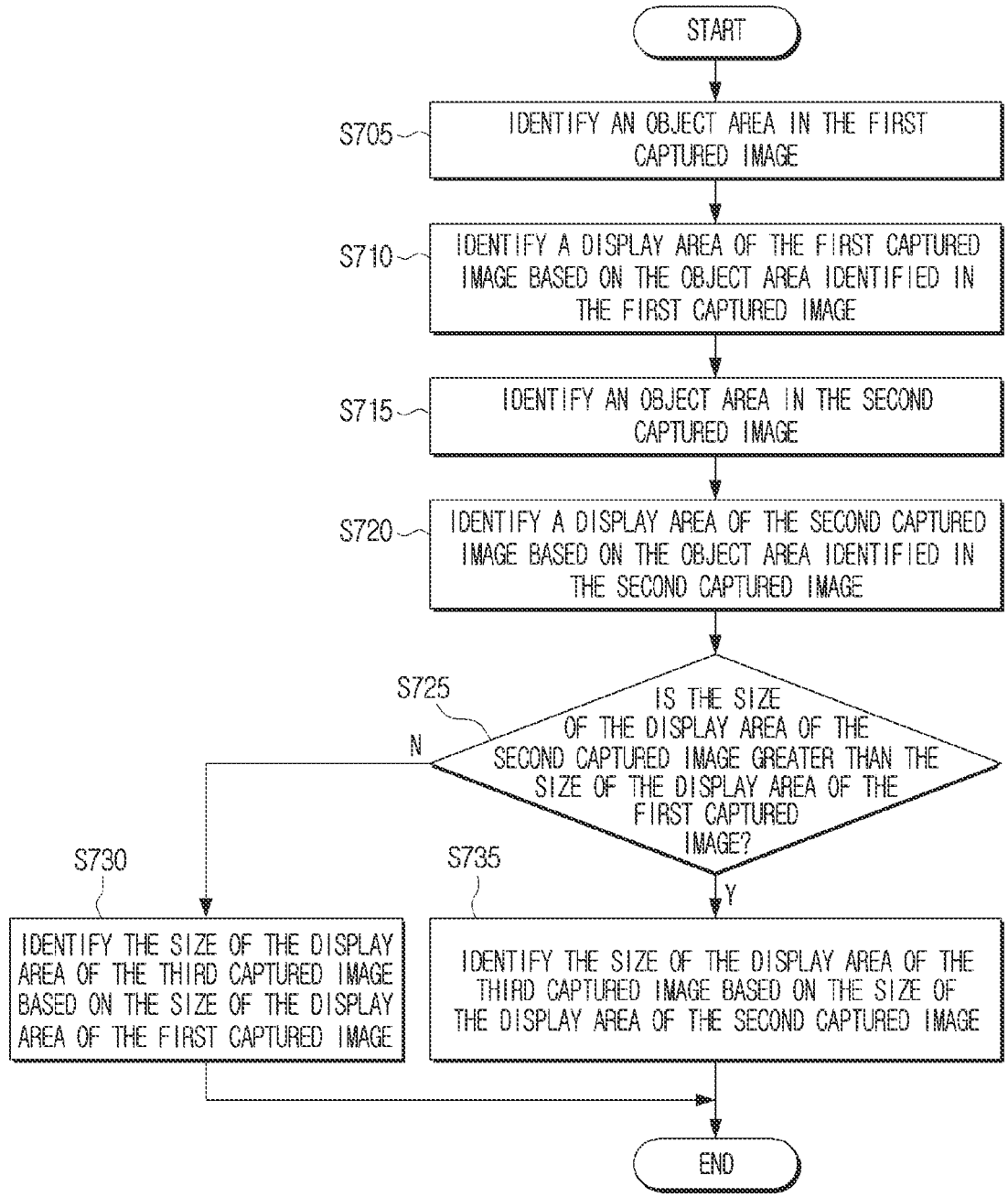
FIG. 7 is a flowchart illustrating an example operation of identifying a size of a display area by comparing images of a user taking a first pose and a second pose to identify a size of a display area according to various embodiments.

FIG. 7 is a flowchart illustrating an example operation of identifying a size of a display area by comparing images of a user taking a first pose and a second pose to identify a size of a display area according to various embodiments.

Referring to FIG. 7, the electronic apparatus 100 may identify an object area in the first captured image in operation S705. The first captured image may refer, for example, to an image captured by the user 1000 taking a first pose. The first captured image may correspond to the captured image 520 of FIG. 5. The electronic apparatus 100 may identify a display area of the first captured image based on the object area identified in the first captured image in operation S710. The electronic apparatus 100 may obtain the size information of the display area of the identified first captured image. The display area of the first captured image may correspond to the display area 523 of the captured image 520 in FIG. 5.

The electronic apparatus 100 may identify an object area in the second captured image in operation S715. The second captured image may refer to an image capturing the user 1000 taking the second pose. The second captured image may correspond to the captured image 620 of FIG. 6. The electronic apparatus 100 may identify a display area of the second captured image based on the object area identified in the second captured image in operation S720. The electronic apparatus 100 may obtain the size information of the display area of the identified second captured image. The display area of the second captured image may correspond to a display area 823 of FIG. 8 and a display area 923 of FIG. 9.

The electronic apparatus 100 may identify whether the size of the display area of the second captured image is greater than the size of the display area of the first captured image in operation S725.

If the size of the display area of the second captured image is not greater than the size of the display area of the first captured image ("N" in operation S725), the electronic apparatus 100 may identify the size of the display area of the third captured image based on the size of the display area of the first captured image in operation S730. That is, the size of the display area of the third captured image may be the same as the size of the display area obtained from the first captured image. The third captured image may refer, for example, to an image captured at a point of time after the second captured image.

If the size of the display area of the second captured image is greater than the size of the display area of the first captured image ("Y" in operation S725), the electronic apparatus 100 may identify the size of the display area of the third captured image based on the size of the display area of the second captured image in operation S735. The size of the display area of the third captured image may be the same as the size of the display area obtained from the second captured image.

The electronic apparatus 100 may maintain the larger size of the display area out of the size of the display area obtained from the first captured image and the size of the display area obtained from the second captured image. That is, a new captured image may be obtained over time, and the pose of the user 1000 may be varied in a new captured image. However, even if the pose of the user 1000 is varied, the electronic apparatus 100 may maintain the largest display area. The electronic apparatus 100 may display an image corresponding to the largest display area in the second area 142 in the plurality of captured images.

When the display area is maintained to be large if captured image is changed, a problem in that a part of the area 624 of FIG. 6 is not displayed on the display 140 may be addressed.

Figure 8:
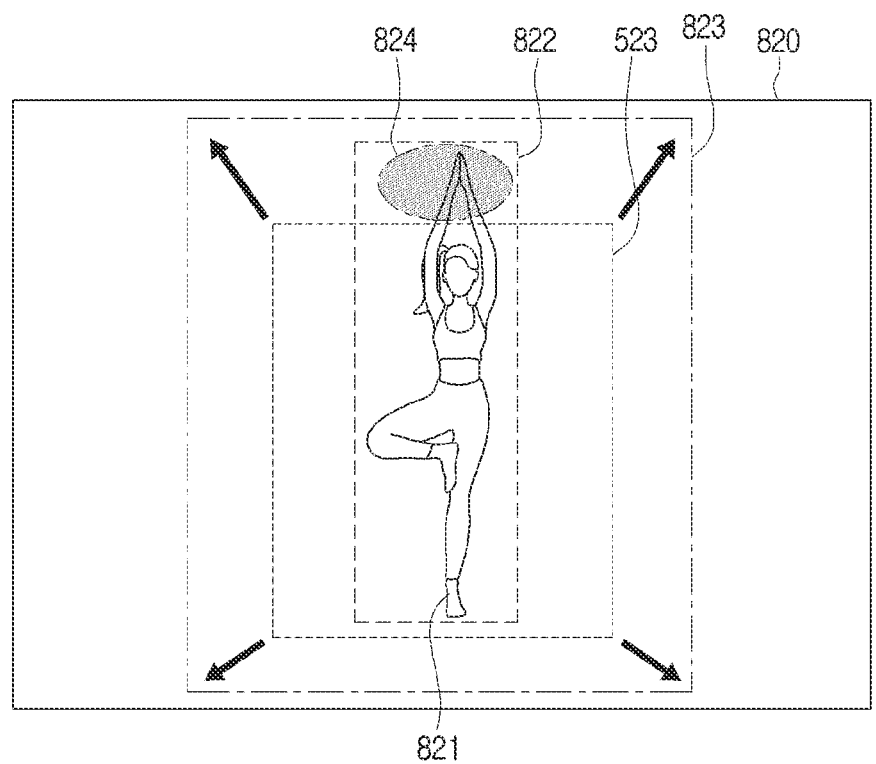
FIG. 8 is a diagram illustrating an example operation of identifying a display area according to various embodiments.

FIG. 8 is a diagram illustrating an example operation of identifying a display area according to various embodiments.

Referring to FIG. 8, the captured image 820 may include a user object 821. The electronic apparatus 100 may identify an object area 822 based on a user object 821. The captured image 820 may be an image capturing the user 1000 taking a second pose. The captured image 820 may include the user object 821, and the electronic apparatus 100 may identify the object area 822 based on the user object 821.

It is assumed that the display area of the captured image 820 is greater than the size of the display area 823 of the captured image 520. The electronic apparatus 100 may upscale the display area in all directions including left, right, up, and down in the object area 822 in identifying the display area of the captured image 820.

When a part of an area 824 of the images corresponding to a user object 821 included in the captured image 820 is not displayed on the display 140, the electronic apparatus 100 may extend all directions to extend the display area. The display area 823 of the captured image 820 corresponding to the second pose may be an area extended in all directions up, down, left, and right compared with the display area 523 of the captured image 520 corresponding to the first pose (e.g., refer to FIG. 5).

Figure 9:
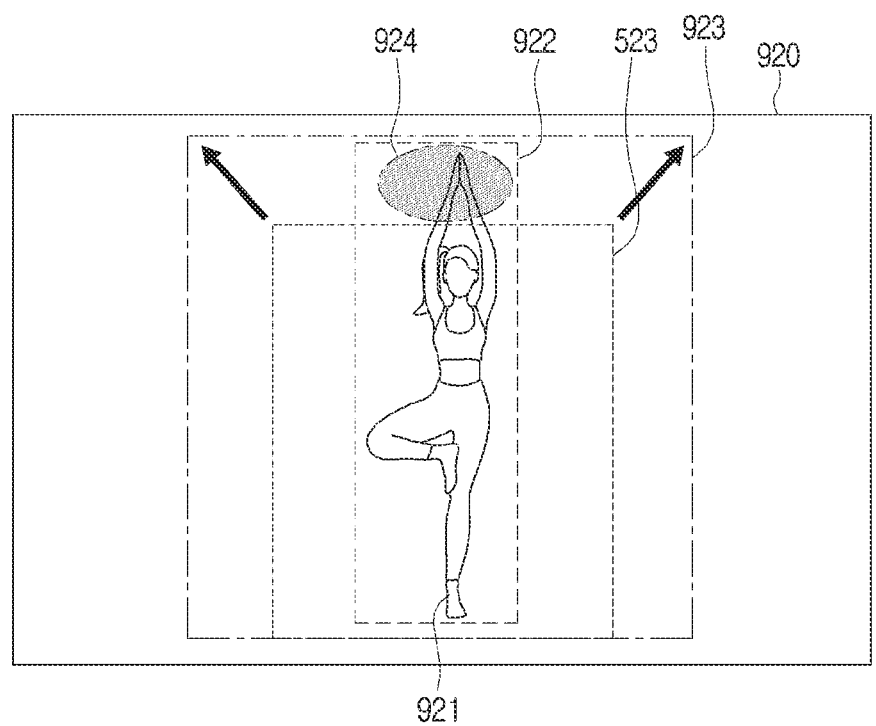
FIG. 9 is a diagram illustrating an example operation of identifying a display area according to various embodiments.

FIG. 9 is a diagram illustrating an example operation of identifying a display area according to various embodiments.

Referring to FIG. 9, a captured image 920 may include a user object 921. The electronic apparatus 100 may identify the object area 922 based on the user object 921. The captured image 920 may be an image capturing the user 1000 taking a second pose. The captured image 920 may include the user object 921, and the electronic apparatus 100 may identify the object area 922 based on the user object 921.

It is assumed that the size of the display area of the captured image 920 is larger than the size of the display area 923 of the captured image 520. In identifying the display area of the captured image 920 by the electronic apparatus 100, the display area may extend in all directions of up, down, left, and right in the object area 922.

When a part of the images corresponding to the user object 921 included in the captured image 920 is not displayed on the display 140, the electronic apparatus 100 may extend the upper direction to expand the display area. The display area 923 of the captured image 920 corresponding to the second pose may be an area extended upward compared to the display area 523 of the captured image 520 corresponding to the first pose (e.g., refer to FIG. 5).

Referring to FIG. 9, unlike FIG. 8, the display area may be extended in the upward direction. In general, since bottom of the image capturing the user 1000 may be fixed, it is unnecessary to extend the display area in a lower direction. Therefore, the display area may be extended in the upward direction due to the movement of the user while the lower direction is fixed to the bottom.

Figure 10:
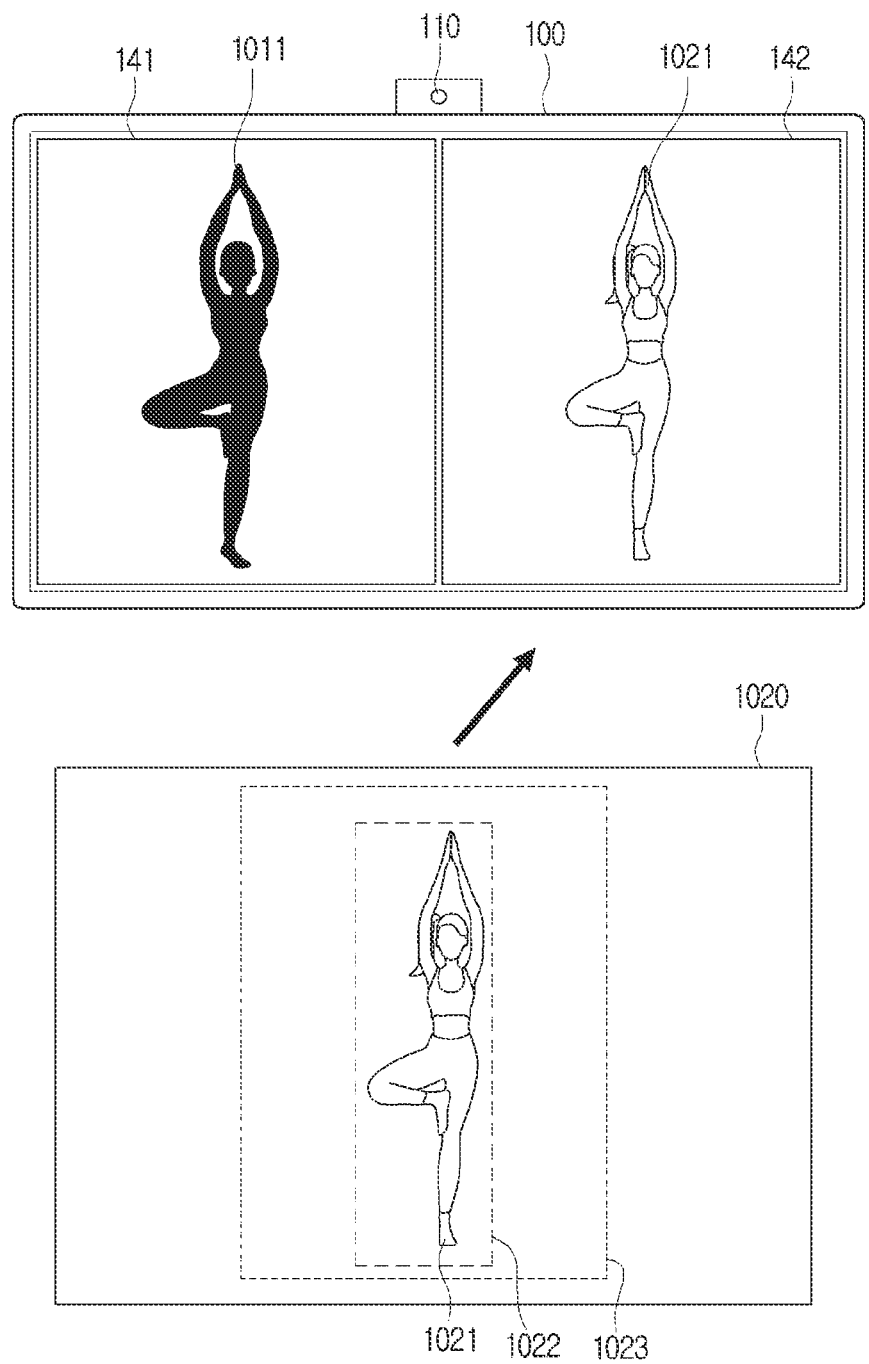
FIG. 10 is a diagram illustrating an example operation of displaying a third captured image based on an identified display area according to various embodiments.

FIG. 10 is a diagram illustrating an example operation of displaying a third captured image based on an identified display area according to various embodiments.

Referring to FIG. 10, the electronic apparatus 100 may obtain a captured image 1020 by capturing the user 1000 taking the second pose through the camera 110. The captured image 1020 may include a user object 1021. The electronic apparatus 100 may identify an object area 1022 based on the user object 1021. A display area 1023 may be identified based on the identified object area 1022.

Referring to the embodiment of FIG. 10, unlike FIG. 6, a predetermined time may be elapsed while the user 1000 is taking the second pose.

The electronic apparatus 100 may display an image corresponding to the identified display area 1023 of the captured image 1020 in the second area 142. The user object 1021 may be displayed in the second area 142. A guide object 1011 may be displayed in the first area 141.

Figure 11:
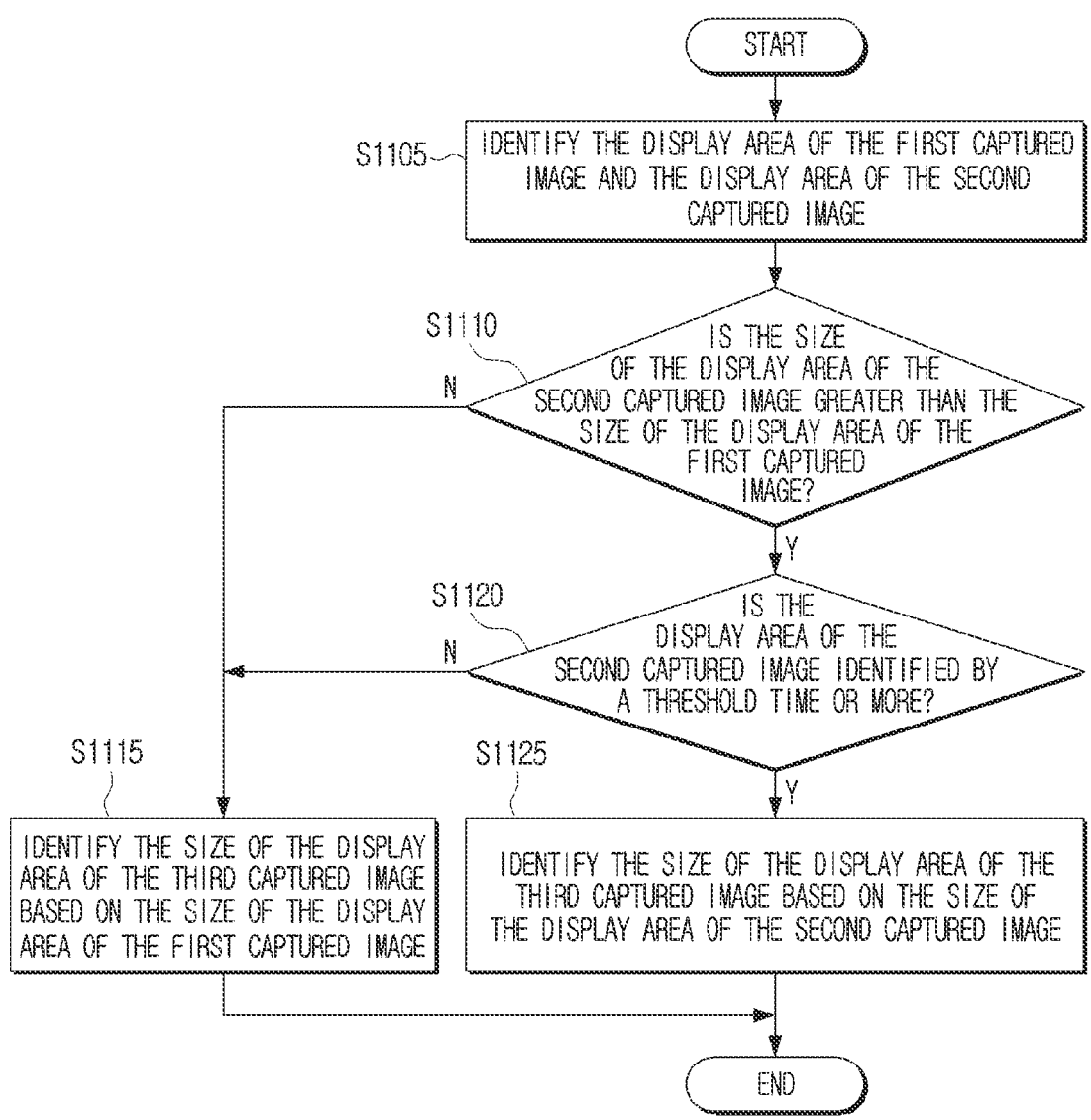
FIG. 11 is a flowchart illustrating an example operation of identifying a display area based on a threshold time according to various embodiments.

FIG. 11 is a flowchart illustrating an example operation of identifying a display area based on a threshold time according to various embodiments.

Referring to FIG. 11, the electronic apparatus 100 may identify the display area of the first captured image and the display area of the second captured image in operation S1105. The operation S1105 may correspond, for example, to S705 to S720 of FIG. 7.

The electronic apparatus 100 may identify whether the size of the display area of the second captured image is greater than the size of the display area of the first captured image in operation S1110. The operation S1110 may correspond to S725 of FIG. 7.

If the size of the display area of the second captured image is not greater than the size of the display area of the first captured image ("N" in operation S1110), the electronic apparatus 100 may identify the size of the display area of the third captured image based on the size of the display area of the first captured image in operation S1115. The size of the display area of the third captured image may be the same as the size of the display area obtained from the first captured image. The third captured image may refer, for example, to an image captured at a point of time after the second captured image.

If the size of the display area of the second captured image is greater than the size of the display area of the first captured image ("Y" in operation S1110), the electronic apparatus 100 may identify whether the display area of the second captured image is greater than or equal to a threshold time in operation S1120. If the display area of the second captured image is not identified for a threshold time or more ("N" in operation S1120), the electronic apparatus 100 may identify the size of the display area of the third captured image based on the size of the display area of the first captured image in operation S1115.

If the display area of the second captured image is identified for a threshold time or more ("Y" in operation S1120), the electronic apparatus 100 may identify the size of the display area of the third captured image based on the size of the display area of the second captured image in operation S1125. That is, the size of the display area of the third captured image may be the same as the size of the display area obtained from the second captured image.

Figure 12:
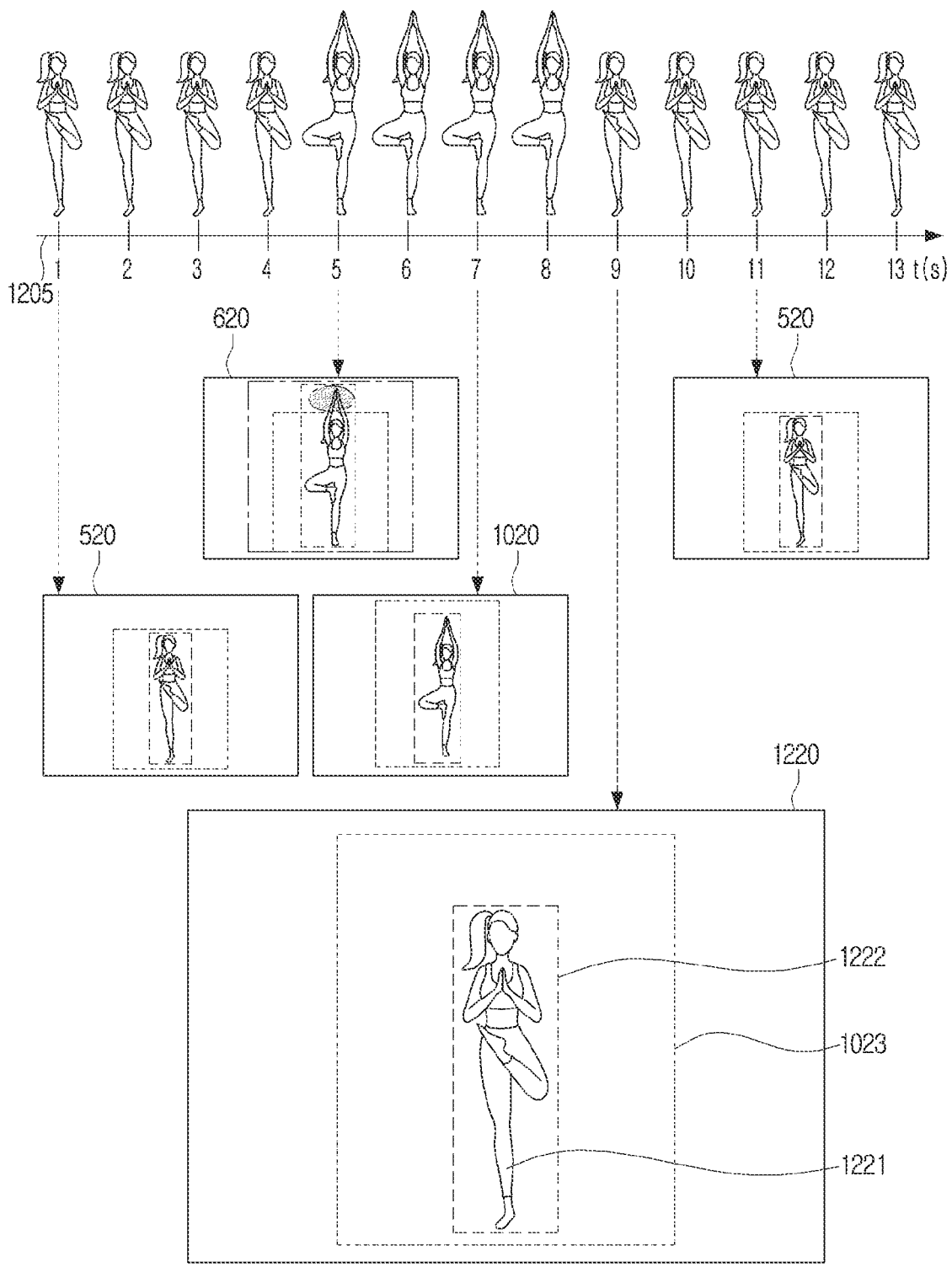
FIG. 12 is a diagram illustrating an example of changing of a display area over time by specifying the operation of FIG. 11 according to various embodiments.

FIG. 12 is a diagram illustrating an example of changing of a display area over time by specifying the operation of FIG. 11 according to various embodiments.

Referring to FIG. 12, a table 1205 illustrates a plurality of consecutive captured images. The plurality of consecutive captured images may include a user object taking a first pose from one to four seconds, a user object taking a second pose from five seconds to eight seconds, and a user object taking a first pose from nine seconds to 13 seconds.

The captured image obtained at one second takes the first pose, which may correspond to the captured image 520 of FIG. 5.

The captured image obtained at five seconds takes a second pose, and may correspond to the captured image 620 of FIG. 6. Since the first pose is taken just before the captured image obtained at 5 seconds, the display area 523 may be maintained. Thus, a part of the area 624 of the captured image 620 may not be displayed on the display 140. The user 1000 watching the display 140 may feel dizzy if the display area is changed directly as the pose is changed. Accordingly, the electronic apparatus 100 may delay change of the display area by a threshold time.

However, if the threshold time (e.g., two seconds) elapses, the electronic apparatus 100 may change to the display area 1023 corresponding to the second pose. The captured image 1020 obtained at seven seconds may be displayed in the display area without omitting the object area 1022 based on the display area 1023.

A captured image 1220 obtained at nine seconds may include a user object 1221 taking the first pose from the second pose. As the time when changing from the second pose to the first pose is a moment, the display area corresponding to the changed first pose may not be changed immediately. Accordingly, the object area in the captured image 1220 may be newly identified as 1222, but the display area may be maintained as the display area 1023 corresponding to the captured image 1020.

If the threshold time (e.g., two seconds) elapses, the electronic apparatus 100 may change to the display area 523 corresponding to the first pose. Thus, the captured image 520 obtained at 11 seconds may be displayed on the display 140 based on the display area 523, since if the display area 1023 is maintained as it is even after the threshold time elapses, the display area may be determined to be always be extended and a problem that the display area may not be matched with the content image displayed on the display 140 may occur.

Figure 13:
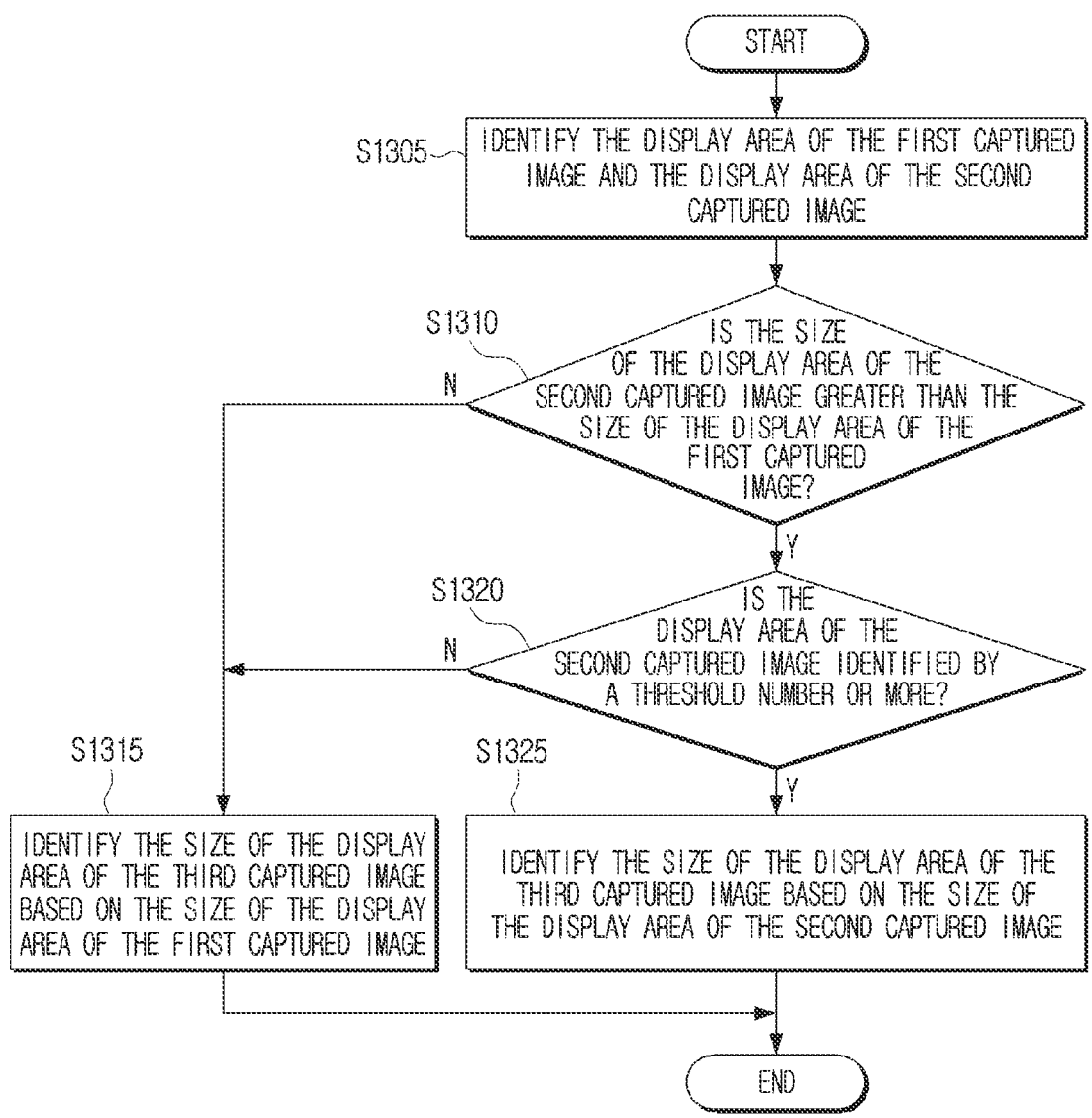
FIG. 13 is a flowchart illustrating an example operation of identifying a display area based on a threshold number according to various embodiments.

FIG. 13 is a flowchart illustrating an example operation of identifying a display area based on a threshold number according to various embodiments.

Referring to FIG. 13, operations S1305, S1310, and S1315 may correspond, for example, to S1105, S1110, and S1115 of FIG. 11. Thus, the overlapped description may not be repeated here.

If the size of the display area of the second captured image is greater than the size of the display area of the first captured image ("Y" in operation S1310), the electronic apparatus 100 may identify whether the display area of the second captured image is greater than or equal to a threshold number in operation S1320. The display area may be identified by a threshold number or more may refer, for example, to the display area being obtained for every predetermined frame based on an object area tracking in real time. The electronic apparatus 100 may count the number of display areas obtained. Counting is performed to identify whether the operation of the user 1000 is repeated. For example, if the user takes a second pose only once, it is possible to consider the existing display area without changing the display area. However, if the second pose is taken by twice or more, the electronic apparatus 100 may change to a display area corresponding to the second pose. The detailed description will be described in greater detail below with reference to FIG. 14.

If the display area of the second captured image is not identified for the threshold number or more ("N" in operation S1320), the electronic apparatus 100 may identify the size of the display area of the third captured image based on the size of the display are of the first captured image in operation S1315.

When the display area of the second captured image is identified by a threshold number or more ("Y" in operation S1320), the electronic apparatus 100 may identify the size of the display area of the third captured image based on the size of the display area of the second captured image in operation S1325. The size of the display area of the third captured image may be the same as the size of the display area obtained from the second captured image.

Figure 14:
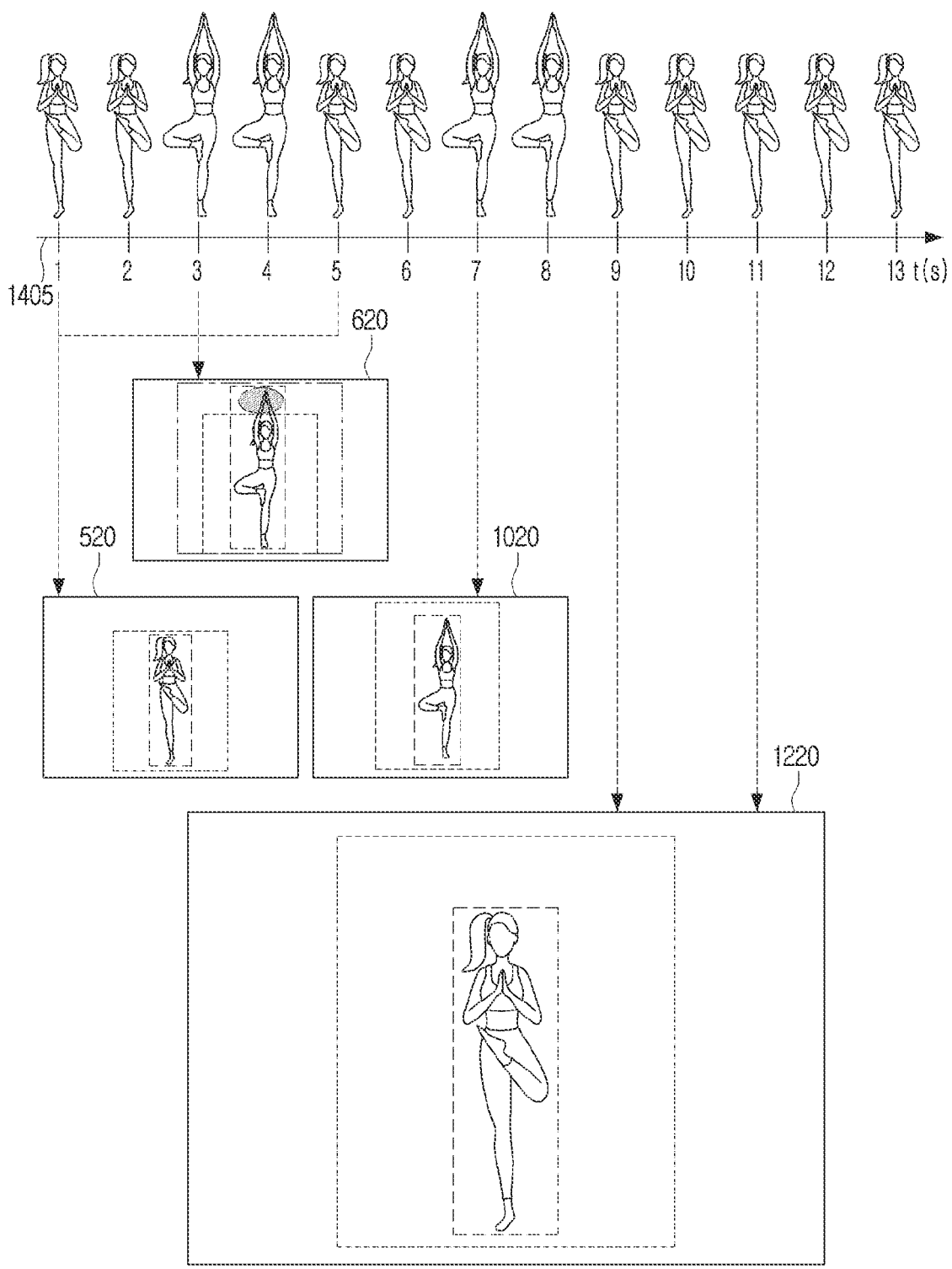
FIG. 14 is a diagram illustrating an example of changing of a display area over time by specifying the operation of FIG. 13 according to various embodiments.

FIG. 14 is a diagram illustrating an example of changing of a display area over time by specifying the operation of FIG. 13 according to various embodiments.

Referring to FIG. 14, a table 1405 shows a plurality of consecutive captured images. The plurality of consecutive captured images may include a user object taking a first pose from one second to two seconds, a user object taking a second pose from three seconds to four seconds, a user object taking a first pose from five seconds to six seconds, a user object taking a second pose up to seven seconds to eight seconds, and a user object taking a first pose from nine seconds to 13 seconds.

Referring to the embodiment of FIG. 14, the user 1000 may take the first pose to the second pose repeatedly in a unit of two seconds.

Referring to an embodiment of FIG. 13, the display area is changed only when the same pose is taken for a threshold time or more, and referring to an embodiment of FIG. 14, the display area is changed only when the same pose is taken for the threshold number (threshold times). or more In the captured image obtained at 1 second, the user object takes the first pose, and may correspond to the captured image 520 of FIG. 5.

Since the captured image obtained at three seconds takes a second pose, the image may correspond to the captured image 620 of FIG. 6. Although the display area identified by taking the second pose of the user object becomes larger in the captured image 620, the identified display area 1023 is not identified by the threshold number (e.g., twice), so that the image by applying the existing display area 523 without applying the identified display area 1023 directly to the captured image may be transmitted to the display 140.

The captured image obtained at second five may take the first pose again. The electronic apparatus 100 may maintain the initial display area 523 as it is.

In the captured image obtained at seven seconds, the user object may take a second pose. Here, the display area 1023 corresponding to the captured image obtained at seven seconds following the captured image obtained at three seconds may be identified by a threshold number (e.g., twice) or more. Accordingly, the electronic apparatus 100 may change the display area 523 to the display area 1023 to display the image on the display 140.

The captured image obtained at 9 seconds may again take a first pose. Since the display area corresponding to the first pose is not larger than the display area corresponding to the second pose, the electronic apparatus 100 may display the image on the display 140 while maintaining the existing display area 1023.

The electronic apparatus 100 may display the image on the display 140 while maintaining the existing display area 1023, since the display area corresponding to the first pose is not larger than the display area corresponding to the second pose, although the captured image obtained at 11 seconds also maintains the first pose.

Referring to an embodiment of FIG. 14, it is identified whether the display area is identified by a threshold number, but the embodiment may be implemented such that the threshold time mentioned in the embodiment of FIG. 13 is applicable simultaneously.

Figure 15:
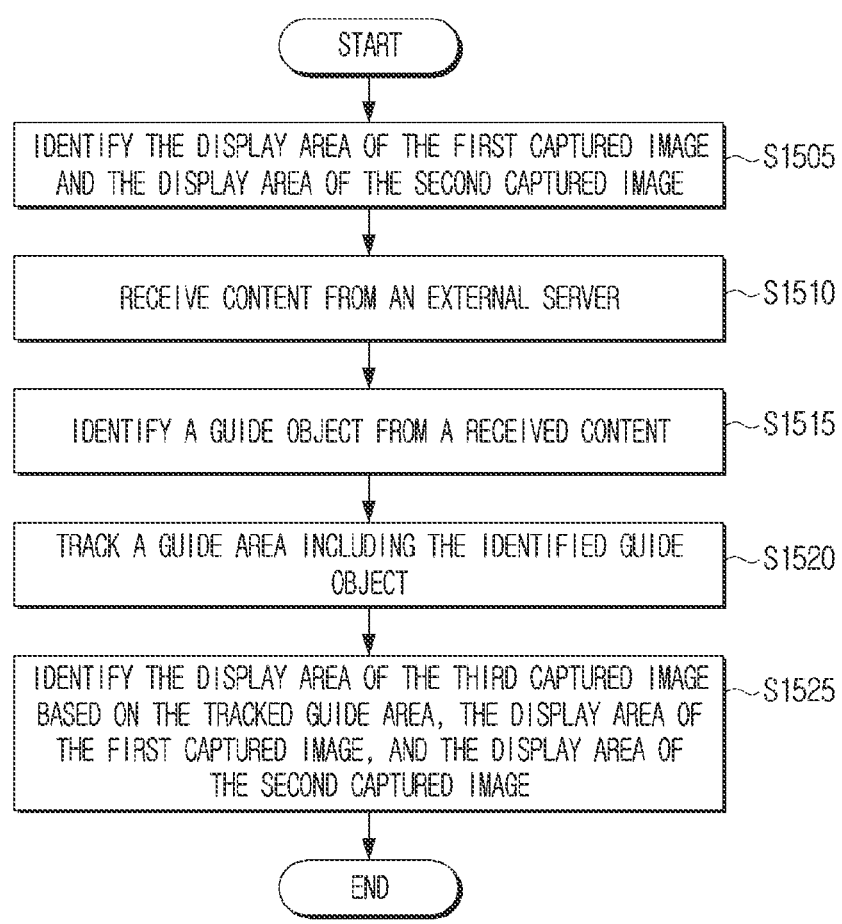
FIG. 15 is a flowchart illustrating an example operation of identifying a display area based on a content received from an external server according to various embodiments.

FIG. 15 is a flowchart illustrating an example operation of identifying a display area based on a content received from an external server according to various embodiments.

Referring to FIG. 15, the electronic apparatus 100 may identify the display area of the first captured image and the display area of the second captured image in operation S1505.

The electronic apparatus 100 may receive content from an external server in operation S1510. S1510 is described as being performed after S1505, but S1510 may be performed in advance.

The electronic apparatus 100 may identify the guide object from the received content in operation S1515. The guide object has been described in greater detail above with reference to FIGS. 5, 6, and 10.

The electronic apparatus 100 may track a guide area including the identified guide object in operation S1520. The guide area may refer, for example, to an area including a guide object in the received content. Therefore, when the size of the guide object is changed, the size of the guide area may be changed.

The electronic apparatus 100 may identify the display area of the third captured image based on the tracked guide area, the display area of the first captured image and the display area of the second captured image.

The electronic apparatus 100 may obtain first ratio information based on a guide area obtained from a first content image corresponding to a time when a first captured image is received and a guide area obtained from a second content image corresponding to a point at which the second captured image is received. The electronic apparatus 100 may obtain second ratio information based on a display area of the first captured image and a display area of the second captured image. The electronic apparatus 100 may identify a larger ratio out of the first ratio information and the second ratio information, and may identify a display area of the third captured image based on the identified large ratio.

According to an embodiment, the ratio information may be obtained as an object area other than a display area of the captured image. This embodiment will be described in greater detail below with reference to FIGS. 16, 17, 18 and 19. Similarly, referring to FIGS. 16, 17, 18 and 19, the ratio information is described based on the object area, it may be equally applied to the display area.

Referring to the embodiment illustrated in FIG. 15, the display area of the third captured image may be determined in additional consideration of the guide area included in the content as well as the captured images.

Figure 16:
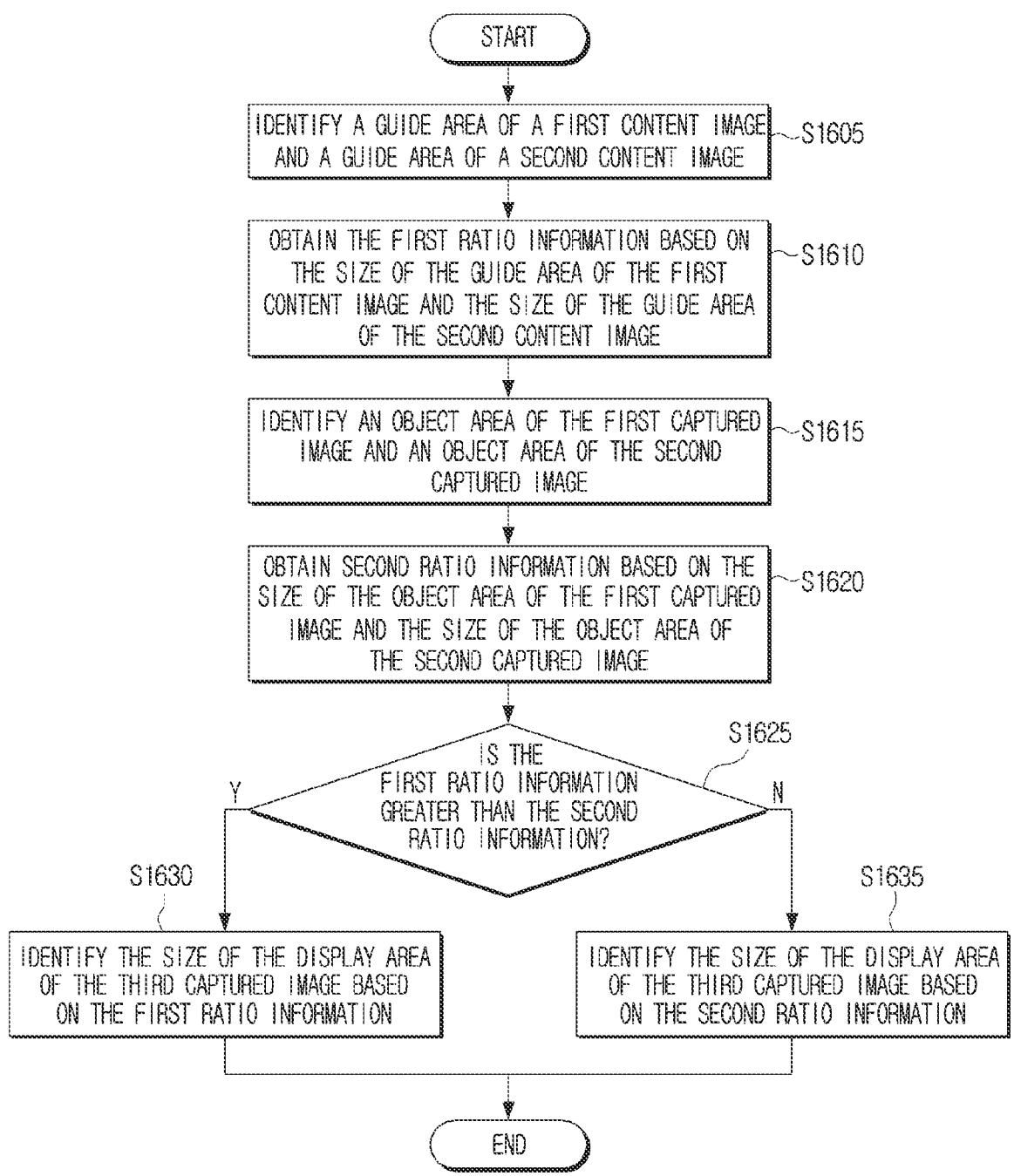
FIG. 16 is a flowchart illustrating an example operation of considering ratio information to identify a size of a display area according to various embodiments.

FIG. 16 is a flowchart illustrating an example operation of considering ratio information to identify a size of a display area according to various embodiments.

Referring to FIG. 16, the electronic apparatus 100 may continuously receive a plurality of content images included in the content. The electronic apparatus 100 may identify a guide area of a first content image and a guide area of a second content image in operation S1605. The electronic apparatus 100 may obtain the first ratio information based on the size of the guide area of the first content image and the size of the guide area of the second content image in operation S1610. The first content image and the second content image may refer to a continuous image according to a time sequence.

The electronic apparatus 100 may identify an object area of the first captured image and an object area of the second captured image in operation S1615. The electronic apparatus 100 may obtain second ratio information based on the size of the object area of the first captured image and the size of the object area of the second captured image in operation S1620.

The first ratio information and the second ratio information may refer, for example, to a ratio of the size change of the compared image. For example, the first ratio information may refer, for example, to the size of the image of the first content: the size of the second content image, and the second ratio information may refer, for example, to the size of the object area of the first captured image: the size of the object area of the second captured image. The ratio information may be divided into vertical ratio information and horizontal ratio information.

The electronic apparatus 100 may identify whether the first ratio information is greater than the second ratio information in operation S1625. If the first ratio information is greater than the second ratio information ("Y" in operation S1625), the electronic apparatus 100 may identify the size of the display area of the third captured image based on the first ratio information in operation S1630. The size of the display area obtained from the third captured image may be identified based on an area obtained by multiplying the object area identified in the third captured image by the first ratio information The electronic apparatus 100 may obtain the changed object area by, for example, multiplying the first ratio information corresponding to the content image by the object area of the first captured image, and may identify the display area of the third captured image based on the changed object area.

If the first ratio information is less than or equal to the second ratio information, the electronic apparatus 100 may identify the size of the display area of the third captured image based on the second ratio information in operation S1635. When the second ratio information corresponding to the captured image is greater than the first ratio information corresponding to the content image, the electronic apparatus 100 may, for example, multiply the object area of the first captured image by the second ratio information to obtain a changed object area, and may identify a display area of the third captured image based on the changed object area. In operation S1635, the same result as S735 in which the display area of the third captured image is identified with only the captured image without considering information about the content may be obtained.

It has been described that the ratio information is applied to the object area, but eventually, the display area may be identified based on the changed object area. Therefore, the ratio information may be directly applied to the display area, not the object area.

In operation S1615 and S1620, the object area of the captured image is used to obtain the second ratio information. However, according to an embodiment, the electronic apparatus 100 may be implemented in the form of using a display area of the captured image to obtain second ratio information.

Figure 17:
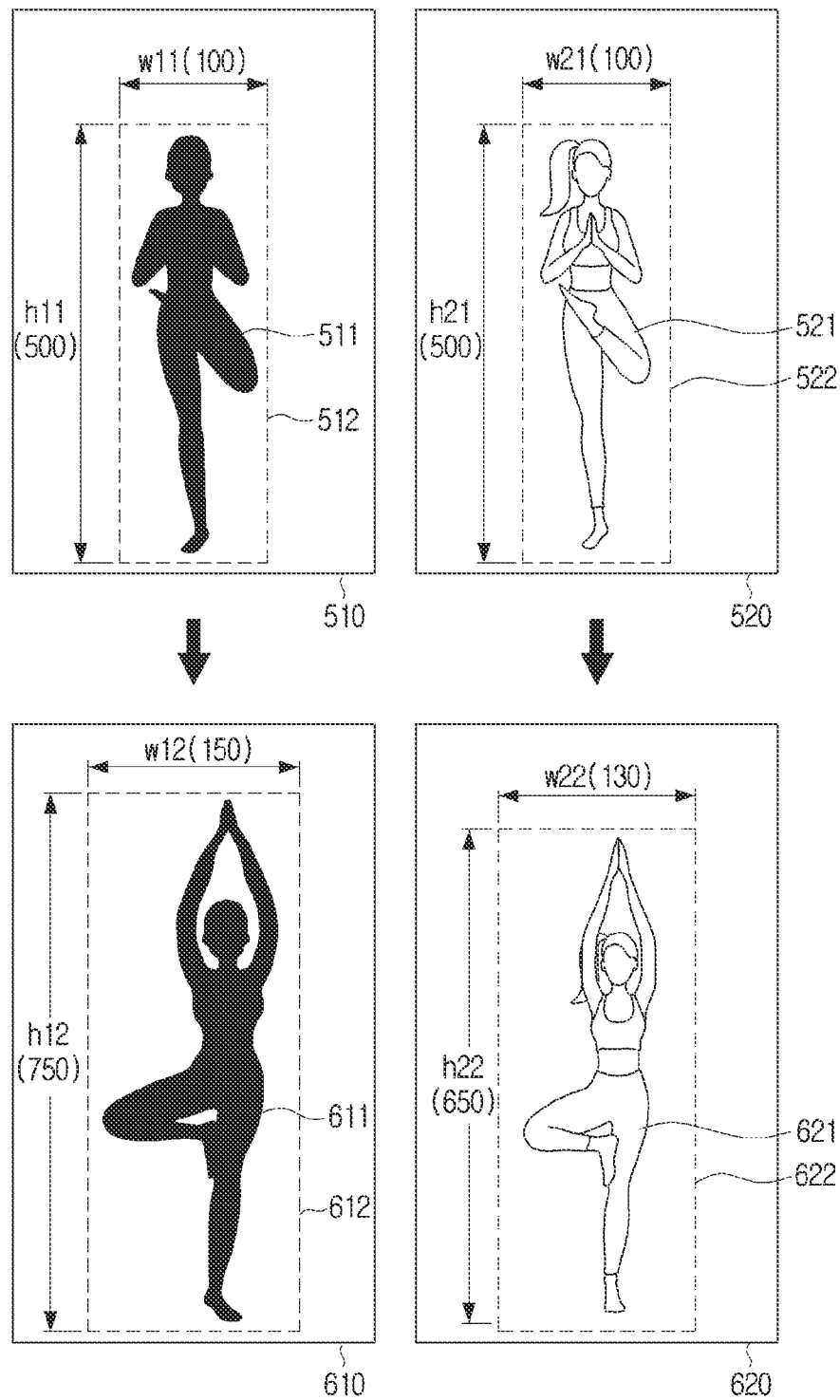
FIG. 17 is a diagram illustrating an example change in a size of an image of taking a first pose and an image of taking a second pose according to various embodiments.

FIG. 17 is a diagram illustrating an example of change in a size of an image of taking a first pose and an image of taking a second pose according to various embodiments.

Referring to FIG. 17, the electronic apparatus 100 may obtain a first content image 510 including a guide object 511 and a first captured image 520 including a user object 521. The first content image 510 and the first captured image 520 may be simultaneously displayed on the display 140. In the guide area 512 of the first content image 510, horizontal information may be h11 (e.g., 500, unit omitted) and the vertical information may be w11 (e.g., 100, unit omitted). In the object area 522 of the first captured image 520, the horizontal information may be h21 (e.g., 500, unit omitted) and the vertical information may be w21 (e.g., 100, unit omitted).

The electronic apparatus 100 may obtain the second content image 610 including a guide object 611 and the second captured image 620 including a user object 621. The second content image 610 and the second captured image 620 may be simultaneously displayed on the display 140. In the guide area 612 of the second content image 610, horizontal information may be h12 (e.g., 750, unit omitted) and the vertical information may be w12 (e.g., 150, unit omitted). In the object area 622 of the second captured image 620, horizontal information may be h22 (e.g., 650, unit omitted) and the vertical information may be w22 (e.g., 130, unit omitted).

The electronic apparatus 100 may obtain the first ratio information based on the first content image 510 and the second content image 610 and may obtain the second ratio information based on the first captured image 520 and the second captured image 620.

Figure 18:
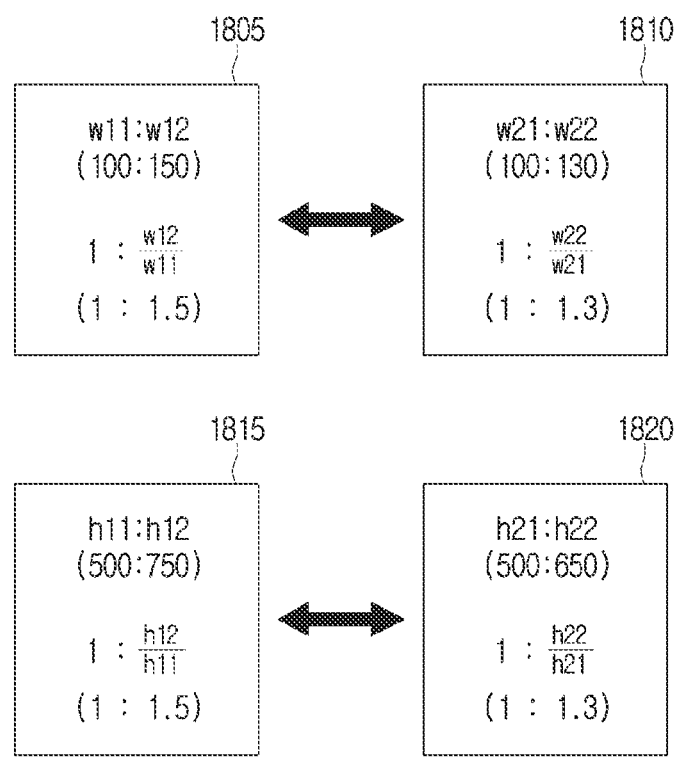
FIG. 18 is a diagram illustrating example ratio information between images of FIG. 17 according to various embodiments.

FIG. 18 is a diagram illustrating example ratio information between images of FIG. 17 according to various embodiments.

Referring to FIG. 18, the electronic apparatus 100 may obtain horizontal ratio information 1805 and vertical ratio information 1815 from the first content image 510 and the second content image 610. The first information may include horizontal ratio information 1805 and the vertical ratio information 1815.

The electronic apparatus 100 may obtain the horizontal ratio information 1810 and the vertical ratio information 1820 in the first and second captured images 520 and 620. The second ratio information may include horizontal rate information 1810 and vertical ratio information 1820.

Since the horizontal information of the first content image 510 is w11 100 and the horizontal information of the second content image 610 is w12 150, the horizontal ratio of the first content image 510 and the second content image 610 may be w11:w12 (100:150) or 1:w12/w11 (1:1.5). Since the horizontal information of the first captured image 520 is w21 100 and the horizontal information of the second captured image 620 is w22 130, the horizontal ratio of the first captured image 520 and the second captured image 620 may be w21:w22 (100:130) or 1:w22/w21 (1:1.3).

For example, since the vertical information of the first content image 510 is h11 500 and the vertical information of the second content image 610 is h12 750, the vertical ratio of the first content image 510 and the second content image 610 may be h11:h12 (500:750) or 1:h12/h11 (1:1.5). Since the vertical information of the first captured image 520 is h21 (500) and the vertical information of the second captured image 620 is h22 (650), the vertical ratio of the first captured image 520 and the second captured image 620 may be h21:h22 (500:650) or 1:h22/h21 (1:1.3).

FIG. 19 is a diagram illustrating an example operation of displaying an image by applying ratio information according to various embodiments.

Referring to FIG. 19, the electronic apparatus 100 may identify larger ratio information between the first ratio information and the second ratio information based on operation S1625 of FIG. 16. According to an embodiment of FIG. 17 and FIG. 18, the first ratio information (1:1.5) may be larger ratio.

The electronic apparatus 100 may multiply the first ratio information to the object area 522 corresponding to the first captured image 520. The electronic apparatus 100 may multiply the horizontal information w21 100 of the object area 522 corresponding to the first captured image 520 by the horizontal ratio information 1805 of the first ratio information to obtain the changed horizontal information w32 (e.g., 150, unit omitted). The electronic apparatus 100 may multiply the vertical information h21 100 of the object area 522 corresponding to the first captured image 520 by the vertical ratio information 1815 of the first ratio information to obtain the changed vertical information h32 (e.g., 750, unit omitted).

The electronic apparatus 100 may identify the changed object area based on the changed horizontal information w32 150 and the changed newly information h32 750. Although an image 1920 in which the changed object area is identified takes a first pose, the electronic apparatus 100 may identify an object area 1922 including a user object 1921 that is greater than the size of the existing object area 522 including the user object 521.

The electronic apparatus 100 identify the display area of the third captured image based on the extended object area 1922.

Referring to FIG. 19, the ratio information is described as being applied to the object area. However, an operation of the electronic apparatus 100 according to an embodiment may identify a display area of the third captured image. Accordingly, the electronic apparatus 100 may be implemented in the form of directly applying ratio information to a display area rather than an object area. For example, the electronic apparatus 100 may identify the size of a new display area by applying the first ratio information directly to the display area 523 of the first captured image 520 of FIG. 5. The electronic apparatus 100 may display an image on the display 140 based on a size of the identified display area.

Figure 20:
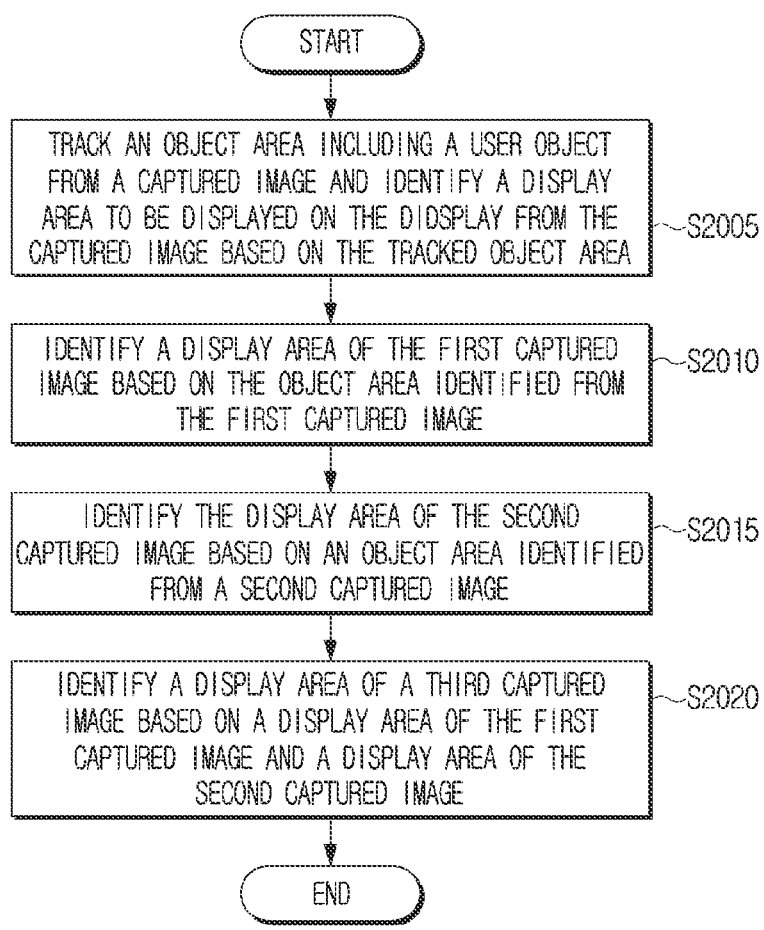
FIG. 20 is a flowchart illustrating an example method of controlling an electronic apparatus according to various embodiments.

FIG. 20 is a flowchart illustrating an example method of controlling an electronic apparatus according to various embodiments.

Referring to FIG. 20, a method of controlling the electronic apparatus 100 may include tracking an object area including a user object from a captured image and identifying a display area from the captured image based on the tracked object area in operation S2005.

The method may include identifying a display area of the first captured image based on the object area identified from the first captured image in operation S2010.

The method may include identifying the display area of the second captured image based on an object area identified from a second captured image in operation S2015.

The method may include identifying a display area of a third captured image based on a display area of the first captured image and a display area of the second captured image in operation S2020.

The identifying a display area of the third captured image in operation S2020 may include, based on a size of a display area of the second captured image being greater than a size of a display area of the first captured image, identifying a display area of the third captured image based on a display area of the second captured image.

The identifying a display area of the first captured image in operation S2010 and the identifying the display area of the second captured image in operation S2015 may include identifying the object area from the captured image based on a height of the user object and identifying the display area based on the identified height of the object area.

The identifying a display area of a third captured image in operation S2020 may include, based on a display area greater than a size of a display area of the first captured image being identified from a plurality of second captured images, which are captured after the first captured image and of which the number is greater than or equal to a threshold number, identifying a display area of the third captured image, and the third captured image may be captured after the plurality of second captured images.

The identifying a display area of the third captured image in operation S2020 may include, based on a display area greater than a size of a display area of the first captured image being identified from a second captured image, which are captured consecutively, and of which the number is greater than or equal to a threshold number, identifying a display area of the third captured image.

The method may further include displaying a screen in which a content image received from an external server is included in a first area and the identified display area is included in a second area.

The method may further include tracking a guide area including a guide object in the content image, and the identifying a display area of the third captured image in operation S2020 may include identifying a display area of the third captured image based on size information of the tracked guide area, size information of an object area of the first captured image, and size information of an object area of the second captured image.

The method may further include obtaining first ratio information based on a size of the guide area identified in the first content image and a size of the guide area identified in a second content image and obtaining second ratio information based on a size of the object area in the first captured image and a size of the object area in the second captured image, and the identifying a display area of the third captured image in operation S2020 may include identifying a display area of the third captured image based on the first ratio information and the second ratio information.

The identifying a display area of the third captured image in operation S2020 may include identifying a display area of the third captured image based on ratio information which is relatively greater out of the first ratio information and the second ratio information.

The identifying a display area of the first captured image in operation S2010, identifying a display area of the second captured image in operation S2015, and identifying a display area of a third captured image in operation S2020 may include identifying a display area to be displayed through the display 140 from the captured image based on resolution information of the display 140 and the tracked object area.

The method of controlling the electronic apparatus 100 as FIG. 20 may be executed by the electronic apparatus 100 having the configuration as illustrated by way of non-limiting example in FIG. 2 or FIG. 3, and by an electronic apparatus having other configurations.

Methods according to the embodiments as described above may be implemented as an application format installable in an existing electronic apparatus.

Methods according to the various example embodiments as described above may be implemented as software upgrade or hardware upgrade for an existing electronic apparatus.

Various example embodiments described above may be performed through an embedded server provided in an electronic apparatus, or an external server of at least one electronic apparatus and a display device.

Various example embodiments may be implemented in software, including instructions stored on non-transitory machine-readable storage media readable by a machine (e.g., a computer). An apparatus may call instructions from the storage medium, and execute the called instruction, including an electronic apparatus, such as electronic apparatus A. When the instructions are executed by a processor, the processor may perform a function corresponding to the instructions directly or using other components under the control of the processor. The instructions may include a code generated by a compiler or a code executable by an interpreter. A machine-readable storage medium may be provided in the form of a non-transitory storage medium, which is tangible, and does not distinguish the case in which a data is semi-permanently stored in a storage medium from the case in which a data is temporarily stored in a storage medium.

The method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., PLAYSTORE™) or distributed online directly. In the case of online distribution, at least a portion of the computer program product may be at least temporarily stored or temporarily generated in a server of the manufacturer, a server of the application store, or a machine-readable storage medium such as memory of a relay server.

The respective elements (e.g., module or program) mentioned above may include a single entity or a plurality of entities. At least one element or operation from of the corresponding elements mentioned above may be omitted, or at least one other element or operation may be added. Alternatively or additionally, some components (e.g., module or program) may be combined to form a single entity. In this case, the integrated entity may perform functions of at least one function of an element of each of the plurality of elements in the same manner as or in a similar manner to that performed by the corresponding element from of the plurality of elements before integration. The module, a program module, or operations executed by other elements according to embodiments may be executed consecutively, in parallel, repeatedly, or heuristically, or at least some operations may be executed according to a different order, may be omitted, or the other operation may be added thereto.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic apparatus comprising:
   a display;
   a camera; and
   a processor configured to control the electronic apparatus to: track an object area including a user object from a plurality of images obtained through the camera,
   wherein the processor is further configured to:
   identify a display area of a first image of the plurality of images based on an object area identified from the first image,
   identify a display area of a second image of the plurality of images, obtained through the camera after the first image, based on an object area identified from the second image,
   identify a display area of a third image of the plurality of images, obtained through the camera after the second image, based on the identified display area of the first image and the identified display area of the second image, and
   control the display to display a screen including a content image including a guide object in a first area of the screen and the identified display area of the third image in a second area of the screen.

2. The electronic apparatus of claim 1, wherein the processor is further configured to:
   based on a size of the identified display area of the second image being greater than a size of the identified display area of the first image, identify the identified display area of the third image based on the identified display area of the second image.

3. The electronic apparatus of claim 1, wherein the processor is further configured to identify the object area from the captured image based on a height of the user object and identify the display area of the first image and the display area of the second image based on an identified height of the object area.

4. The electronic apparatus of claim 1, wherein the processor is further configured to,
   capture a plurality of second captured images after the first image, the plurality of second captured images including the second image;
   obtain, from the plurality of second captured images, a number of times where a display area having a size greater than a size of the identified display area of the first captured image is identified; and
   based on the obtained number being equal to or greater than a threshold number, identify the display area of the third image, and
   wherein the third image is captured after the plurality of second captured images.

5. The electronic apparatus of claim 4, wherein the plurality of second captured images are images captured consecutively.

6. The electronic apparatus of claim 1,
   wherein the content image is received from an external server,
   wherein the processor is further configured to track a guide area of the guide object in the content image, and
   wherein the display area of the third image is identified based on the guide area of the content image.

7. The electronic apparatus of claim 1, wherein the processor is further configured to:
   track a guide area including a guide object in the content image, and
   identify the display area of the third image based on size information of the tracked guide area of the content image, size information of an object area of the first image, and size information of an object area of the second image.

8. The electronic apparatus of claim 7, wherein the processor is further configured to:
   obtain first ratio information based on a size of a guide area identified in a first content image and a size of a guide area identified in a second content image,
   obtain second ratio information based on a size of the object area in the first image and a size of the object area in the second image, and
   identify the display area of the third image based on the first ratio information and the second ratio information.

9. The electronic apparatus of claim 8, wherein the processor is further configured to identify the display area of the third image based on ratio information that is the greater of the first ratio information and the second ratio information.

10. The electronic apparatus of claim 1, wherein the processor is further configured to identify the display area of the third image, to be displayed through the display, based on resolution information of the display and the tracked object area.

11. A method of controlling an electronic apparatus, the method comprising:
    tracking an object area including a user object from a plurality of images obtained through a camera;
    identifying a display area of a first image of the plurality of images based on an object area identified from the first image;

identifying a display area of a second image of the plurality of images, obtained through the camera after the first image, based on an object area identified from the second image;

identifying a display area of a third image of the plurality of images, obtained through the camera after the second image, based on the identified display area of the first image and the identified display area of the second image; and displaying a screen including a content image including a guide object in a first area of the screen and the identified display area of the third image in a second area of the screen.

12. The method of claim 11, wherein the identifying the display area of the third image comprises, based on a size of the identified display area of the second image being greater than a size of the identified display area of the first image, identifying the display area of the third image based on the display area of the second image.

13. The method of claim 11, wherein the identifying the display area of the first image and identifying the display area of the second image comprise identifying the object area from the captured image based on a height of the user object and identifying the display area of the first image and the display area of the second image based on an identified height of the object area.

14. The method of claim 11, wherein the identifying the display area of a third image comprises, capturing a plurality of second captured images after the first image, the plurality of second captured images including the second image;

obtaining, from the plurality of second captured images, a number of times where a display area having a size greater than a size of the identified display area of the first captured image is identified; and based on the obtained number being equal to or greater than a threshold number, identifying the display area of the third captured image, and wherein the third image is captured after the plurality of second captured images.

15. The method of claim 14, wherein the plurality of second captured images are images captured consecutively.

16. The method of claim 11, wherein the content image is received from an external server, and the method further includes tracking a guide area of the guide object in the content image, and wherein the display area of the third image is identified based on the guide area of the content image.

17. The method of claim 11, further comprising:

tracking a guide area including a guide object in the content image, wherein the identifying the display area of the third image comprises identifying the display area of the third image based on size information of the tracked guide area of the content image, size information of an object area of the first image, and size information of an object area of the second image.

18. The method of claim 17, further comprising:

obtaining first ratio information based on a size of a guide area identified in a first content image and a size of a guide area identified in a second content image; and obtaining second ratio information based on a size of the object area in the first image and a size of the object area in the second image, wherein the identifying the display area of the third image comprises identifying the display area of the third image based on the first ratio information and the second ratio information.

19. The method of claim 18, wherein the identifying the display area of the third image comprises identifying the display area of the third image based on ratio information that is the greater of the first ratio information and the second ratio information.

20. The method of claim 11, wherein the identifying the display area of the third image comprises identifying the display area of the third image, to be displayed through the display, based on resolution information of a display and the tracked object area.

* * * * *